US012615629B2

(12) United States Patent　　　　　(10) Patent No.:　US 12,615,629 B2

You et al.　　　　　　　　　　　　　(45) Date of Patent:　Apr. 28, 2026

(54) METHOD FOR SPATIAL RESOURCE OF IAB NODE FOR SIMULTANEOUS OPERATION AND APPARATUS USING THE METHOD

(71) Applicant: LG Electronics Inc., Seoul (KR)

(72) Inventors: Hyangsun You, Seoul (KR); Hyunsoo Ko, Seoul (KR); Byounghoon Kim, Seoul (KR); Jiwon Kang, Seoul (KR); Haewook Park, Seoul (KR)

(73) Assignee: LG Electronics Inc., Seoul (KR)

( * ) Notice: Subject to any disclaimer, the term of this patent is extended or adjusted under 35 U.S.C. 154(b) by 455 days.

(21) Appl. No.: 17/741,733

(22) Filed: May 11, 2022

(65) Prior Publication Data

US 2022/0369302 A1　Nov. 17, 2022

Related U.S. Application Data

(60) Provisional application No. 63/187,380, filed on May 11, 2021.

(30) Foreign Application Priority Data

Oct. 1, 2021　(KR) ........................ 10-2021-0131094

(51) Int. Cl.
H04W 72/044　　(2023.01)
H04W 84/04　　(2009.01)

(52) U.S. Cl.
CPC ........ H04W 72/046 (2013.01); H04W 84/047 (2013.01)

(58) Field of Classification Search
CPC . H04W 72/046; H04W 7/088; H04W 7/0695; H04W 84/04; H04W 7/022; H04W 74/0833

See application file for complete search history.

(56) References Cited

U.S. PATENT DOCUMENTS

2020/0044785 A1 *　2/2020　Park ...................... H04L 1/1819
2020/0229271 A1 *　7/2020　You ...................... H04W 72/23

(Continued)

FOREIGN PATENT DOCUMENTS

WO　　WO 2019/212297 A1　　11/2019
WO　　WO 2021035462　　　3/2021
WO　　WO-2022208455 A1 * 10/2022　........... H04B 7/0695

OTHER PUBLICATIONS

Apple Inc., "Enhanced resource multiplexing within an IAB node," 3GPP TSG RAN WG1 #104b-e, R1-2103120, e-Meeting, Apr. 12-20, 2021, 4 pages.

(Continued)

*Primary Examiner* — Mahran Y Abu Roumi

(74) *Attorney, Agent, or Firm* — Fish & Richardson P.C.

(57) ABSTRACT

The present specification provides a method performed by a node for transmitting beam informing information in a wireless communication system, and an apparatus therefor, the method comprising: performing an initial access with a parent node; determining the beam informing information; and transmitting, to the parent node, the beam informing information, wherein the beam informing information includes at least one of transmission (TX) beam information and reception (RX) beam information which is recommended for mobile terminal (MT) operation of the node.

7 Claims, 23 Drawing Sheets

(56)     References Cited

U.S. PATENT DOCUMENTS

| | | | |
|---|---|---|---|
| 2021/0251011 A1 | 8/2021 | You et al. | |
| 2023/0318690 A1* | 10/2023 | Kurras | H04B 7/06 |
| | | | 375/262 |
| 2024/0098517 A1* | 3/2024 | Fakoorian | H04W 52/281 |

OTHER PUBLICATIONS

Lenovo et al., "Resource multiplexing in enhanced IAB systems," 3GPP TSG RAN WG1 Meeting #104-bis-e, R1-2103608, e-Meeting, Apr. 12-20, 2021, 9 pages.

PCT International Search Report in International Application No. PCT/KR2022/006621, dated Aug. 12, 2022, 6 pages (with English translation).

Zte et al., "Enhancements for simultaneous operation of child and parent links," 3GPP TSG RAN WG1 #103-e, R1-2008859, e-Meeting, Oct. 26-Nov. 13, 2020, 7 pages.

Zte et al., "Enhancements to the IAB resource multiplexing," 3GPP TSG RAN WG1 #104bis-e, R1-2103497, e-Meeting, Apr. 12-20, 2021, 6 pages.

AT&T, "Summary of [104b-e-NR-elAB-01] - Kickoff," R1-2103837, 3GPP TSG-RAN WG1, #104b-e, e-Meeting, Apr. 12-20, 2021, 19 pages.

Extended European Search Report in European Appln. No. 22807767. 3, mailed on Jul. 26, 2024, 11 pages.

Lenovo, Motorola Mobility, "Resource multiplexing in enhanced IAB systems," R1-2109936, 3GPP TSG RAN WG1, Meeting #106-bis-e, e-Meeting, Oct. 11-19, 2021, 15 pages.

Vivo, "Enhancement to resource multiplexing between child and parent links," R1-2102538, 3GPP TSG RAN WG1 #104b-e, e-Meeting, Apr. 12-20, 2021, 8 pages.

Office Action in Japanese Appln. No. 2023-569862, mailed on Jan. 7, 2025, 5 pages (with English translation).

Sharp, "On TRS/CSI-RS occasions for idle/inactive UEs," R1-2103479, 3GPP TSG RAN WG1 #104bis-e, e-Meeting, Apr. 12-20, 2021, 5 pages.

Office Action in Korean Appln. No. 10-2023-7033620, mailed on Jan. 9, 2025, 11 pages (with English translation).

* cited by examiner

DgNB

RN1

RN2

UE1

UE2

UE3

→ : Backhaul link

→ : Access link

—————— : Backhaul(BH) link
▬▬▬▬▬ : Access(AC) link

IAB node

MT Tx          MT Rx          DU Tx          DT Rx

IAB node

MT Tx/    MT Rx/    MT Tx/    MT Rx/
DU Tx     DU Rx     DU Rx     DU Tx determine beam indication information ⎯S1710 transmit the beam indication information
to the parent node
(the beam informing information includes
at least one of transmission (TX) beam information
and reception (RX) beam information which is
recommended for mobile terminal (MT)
operation of the node) ⎯S1720

FIG. 18 processor
(1800)

information
determining unit
(1810)

information
transmitting unit
(1820)

Figure 19:
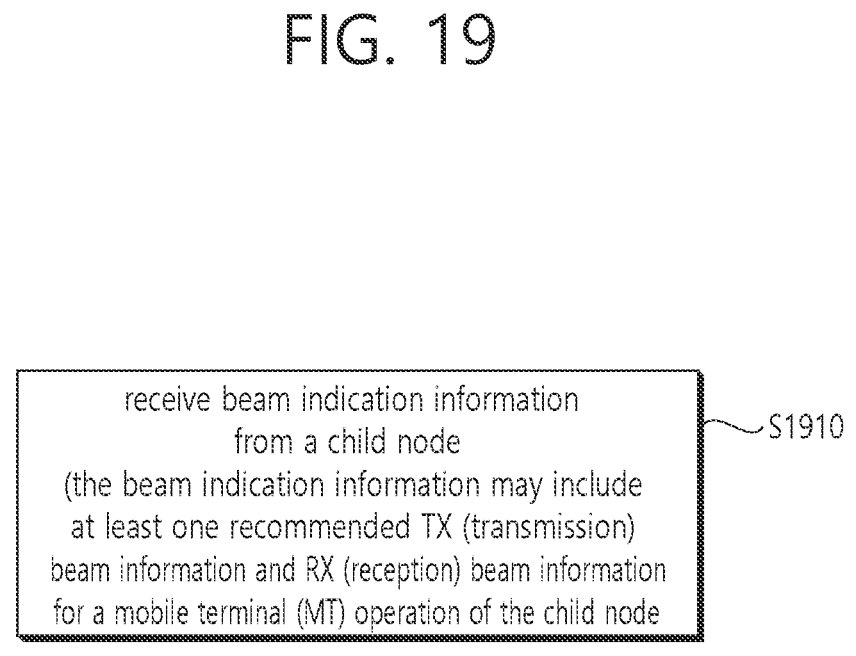

FIG. 19 receive beam indication information
from a child node
(the beam indication information may include
at least one recommended TX (transmission)
beam information and RX (reception) beam information
for a mobile terminal (MT) operation of the child node ⟶ S1910

FIG. 20 processor
(2000)

information
receiving unit
(2010)

FIG. 21

METHOD FOR SPATIAL RESOURCE OF IAB NODE FOR SIMULTANEOUS OPERATION AND APPARATUS USING THE METHOD

CROSS-REFERENCE TO RELATED APPLICATIONS

Pursuant to 35 U.S.C. § 119, this application claims the benefit of U.S. Provisional Application No. 63/187,380 filed on May 11, 2021 and Korean Patent Application No. 10-2021-0131094 filed on Oct. 1, 2021 the contents of which are all hereby incorporated by reference herein in their entirety.

BACKGROUND OF THE DISCLOSURE

Field of the Disclosure

The present specification relates to wireless communication.

Related Art

As a wider range of communication devices require larger communication capacities, the need for mobile broadband communication that is more enhanced than the existing Radio Access Technology (RAT) is rising. Additionally, massive Machine Type Communications (massive MCT), which connects multiple devices and objects so as to provide various services regardless of time and place, is also one of the most important issues that are to be considered in the next generation communication. Moreover, discussions are made on services/terminals (or user equipment (UE)) that are sensitive to reliability and latency. And, discussions are made on the adoption of a next generation radio access technology that is based on the enhanced mobile broadband communication, massive MTC, Ultra-Reliable and Low Latency Communication (URLLC), and so on. And, for convenience, the corresponding technology will be referred to as a new radio access technology (new RAT or NR).

Meanwhile, in the present specification, it is intended to provide a method of transmitting information related to a beam performed by a node.

SUMMARY OF THE DISCLOSURE

Technical Solutions

According to an embodiment of the present specification, a method and an apparatus are provided. The method and apparatus comprise transmitting the beam indication information to a parent node, here, the beam indication information includes at least one TX (transmission) beam information and RX (reception) beam information recommended for a mobile terminal (MT) operation of the node.

EFFECTS OF THE DISCLOSURE

According to this specification, the parent node may provide an effect of appropriately setting the Tx/Rx beam information of the MT to the IAB node, which is a child node, by reflecting this. In addition, the IAB node may provide an effect of smoothly performing simultaneous operation between the MT and the DU.

The effects that can be obtained through a specific example of the present specification are not limited to the effects listed above. For example, there may be various technical effects that a person having ordinary skill in the related art can understand or derive from the present specification. Accordingly, specific effects of the present specification are not limited to those explicitly described in the present specification, and may include various effects that can be understood or derived from the technical features of the present specification.

BRIEF DESCRIPTION OF THE DRAWINGS

FIG. 5 shows examples of 5G usage scenarios to which the technical features of the present specification can be applied.

FIG. 7 schematically illustrates an example of a link between a DgNB, an RN, and a UE.

FIG. 18 is an example of a block diagram of an apparatus for transmitting beam indication information from a node's point of view, according to an embodiment of the present specification.

FIG. 19 is a flowchart of a method of receiving beam indication information from a node's point of view, according to an embodiment of the present specification.

FIG. 20 is an example of a block diagram of an apparatus for receiving beam indication information from a node's point of view, according to an embodiment of the present specification.

FIG. 21 shows an exemplary communication system (1), according to an embodiment of the present specification.

DESCRIPTION OF EXEMPLARY EMBODIMENTS

In the present specification, "A or B" may mean "only A", "only B" or "both A and B". In other words, in the present specification, "A or B" may be interpreted as "A and/or B". For example, in this specification, "A, B or C" refers to "only A", "only B", "only C", or "any combination of A, B and C".

A forward slash (/) or comma used herein may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" can be interpreted the same as "at least one of A and B".

In addition, in the present specification, "at least one of A, B and C" means "only A", "only B", "only C", or "any combination of A, B and C". In addition, "at least one of A, B or C" or "at least one of A, B and/or C" can mean "at least one of A, B and C".

In addition, parentheses used in the present specification may mean "for example". Specifically, when described as "control information (PDCCH)", "PDCCH" may be proposed as an example of "control information". In other words, "control information" of the present specification is not limited to "PDCCH", and "PDDCH" may be suggested as an example of "control information". In addition, even when described as "control information (i.e., PDCCH)", "PDCCH" may be proposed as an example of "control information".

In the present specification, technical features that are individually described in one drawing may be implemented individually or at the same time.

Hereinafter, a new radio access technology (new RAT, NR) will be described.

As a wider range of communication devices require larger communication capacities, the need for mobile broadband communication that is more enhanced than the existing Radio Access Technology (RAT) is rising. Additionally, massive Machine Type Communications (massive MCT), which connects multiple devices and objects so as to provide various services regardless of time and place, is also one of the most important issues that are to be considered in the next generation communication. Moreover, discussions are made on services/terminals (or user equipment (UE)) that are sensitive to reliability and latency. And, discussions are made on the adoption of a next generation radio access technology that is based on the enhanced mobile broadband communication, massive MTC, Ultra-Reliable and Low Latency Communication (URLLC), and so on. And, for convenience, the corresponding technology will be referred to as a new RAT or NR.

Figure 1:
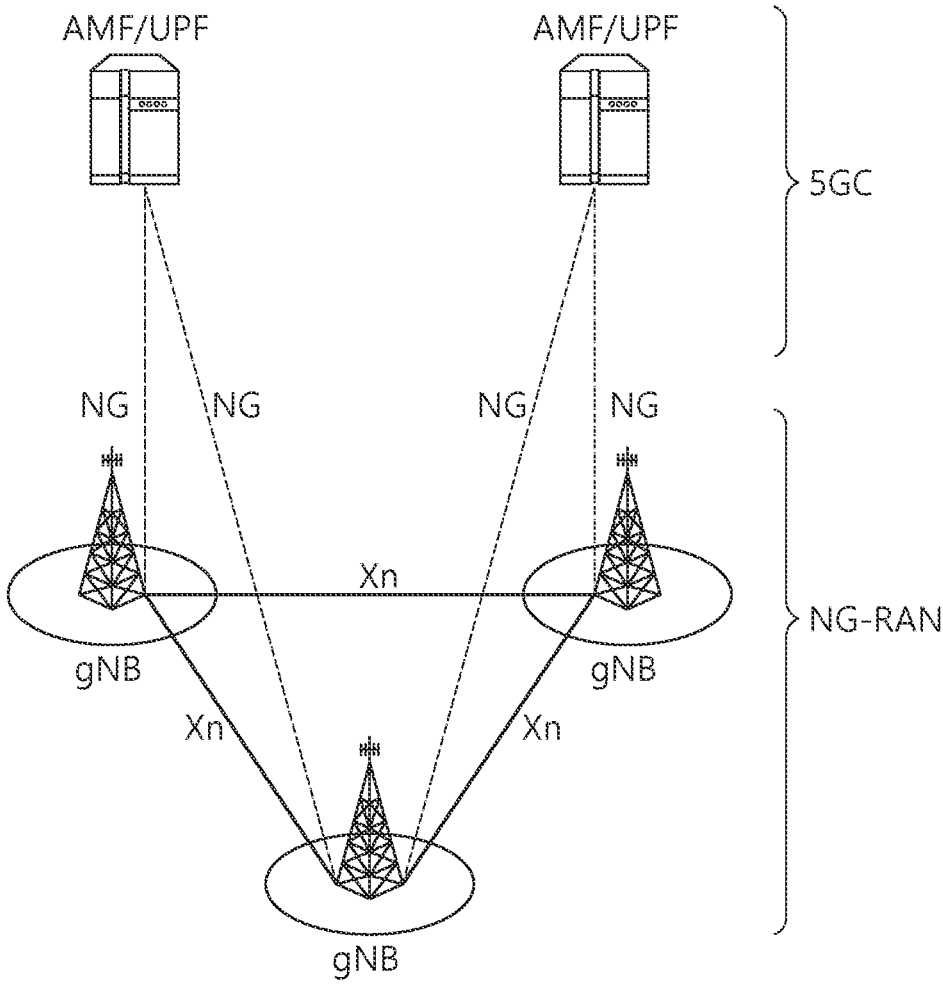
FIG. 1 illustrates a system structure of a new generation radio access network (NG-RAN) to which NR is applied.

FIG. 1 illustrates a system structure of a new generation radio access network (NG-RAN) to which NR is applied.

Referring to FIG. 1, the NG-RAN may include a gNB and/or an eNB providing a user plane and a control plane protocol termination to a terminal. FIG. 1 illustrates a case of including only the gNB. The gNB and eNB are connected to each other by an Xn interface. The gNB and eNB are connected to a 5G Core Network (5GC) through an NG interface. More specifically, the gNB and eNB are connected to the access and mobility management function (AMF) through an NG-C interface and connected to a user plane function (UPF) through an NG-U interface.

Figure 2:
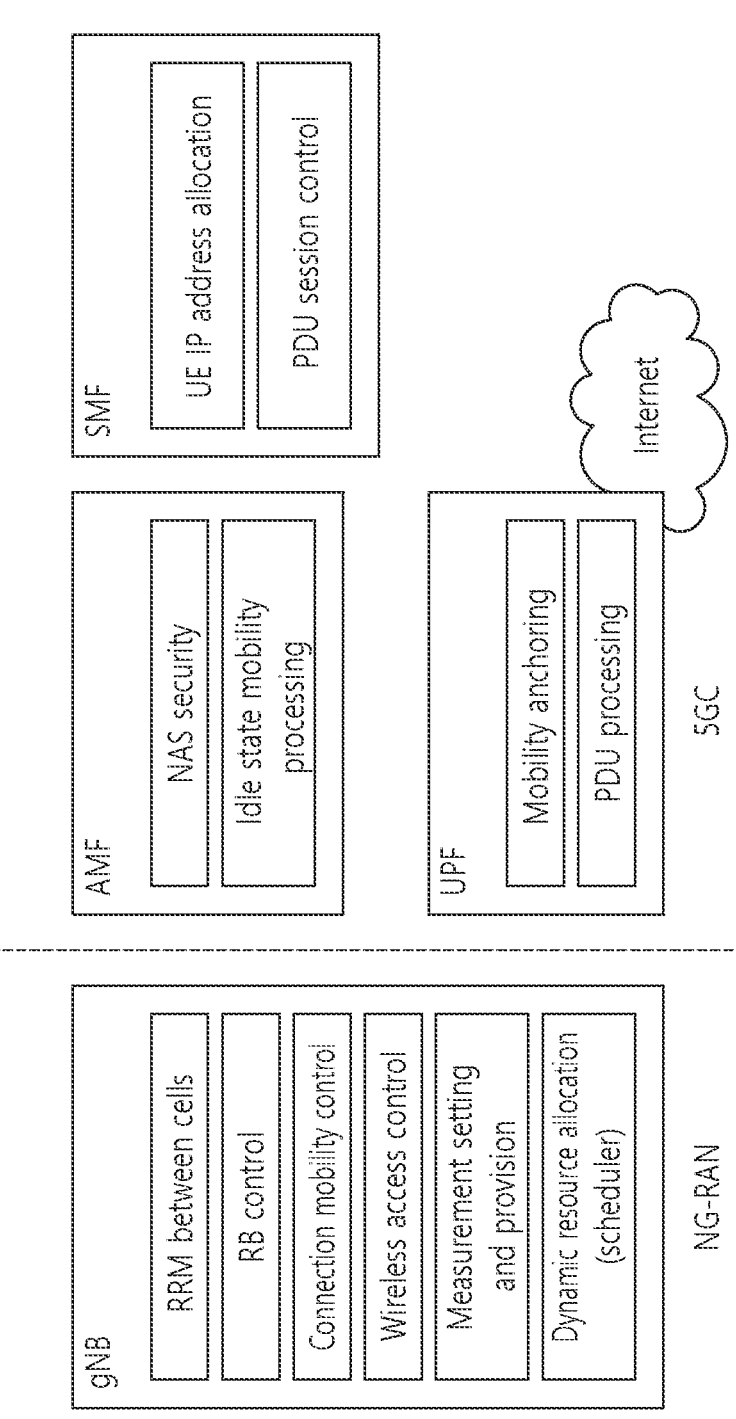
FIG. 2 illustrates functional partitioning between NG-RAN and 5GC.

FIG. 2 illustrates functional partitioning between NG-RAN and 5GC.

Referring to FIG. 2, the gNB may provide inter-cell radio resource management (RRM), radio bearer (RB) control, connection mobility control, radio access control, measurement configuration & provision, dynamic resource allocation, and the like. An AMF may provide functions such as NAS security, idle state mobility handling, and the like. A UPF may provide functions such as mobility anchoring, PDU handling, and the like. A session management function (SMF) may provide functions such as UE IP address allocation, PDU session control, and the like.

Figure 3:
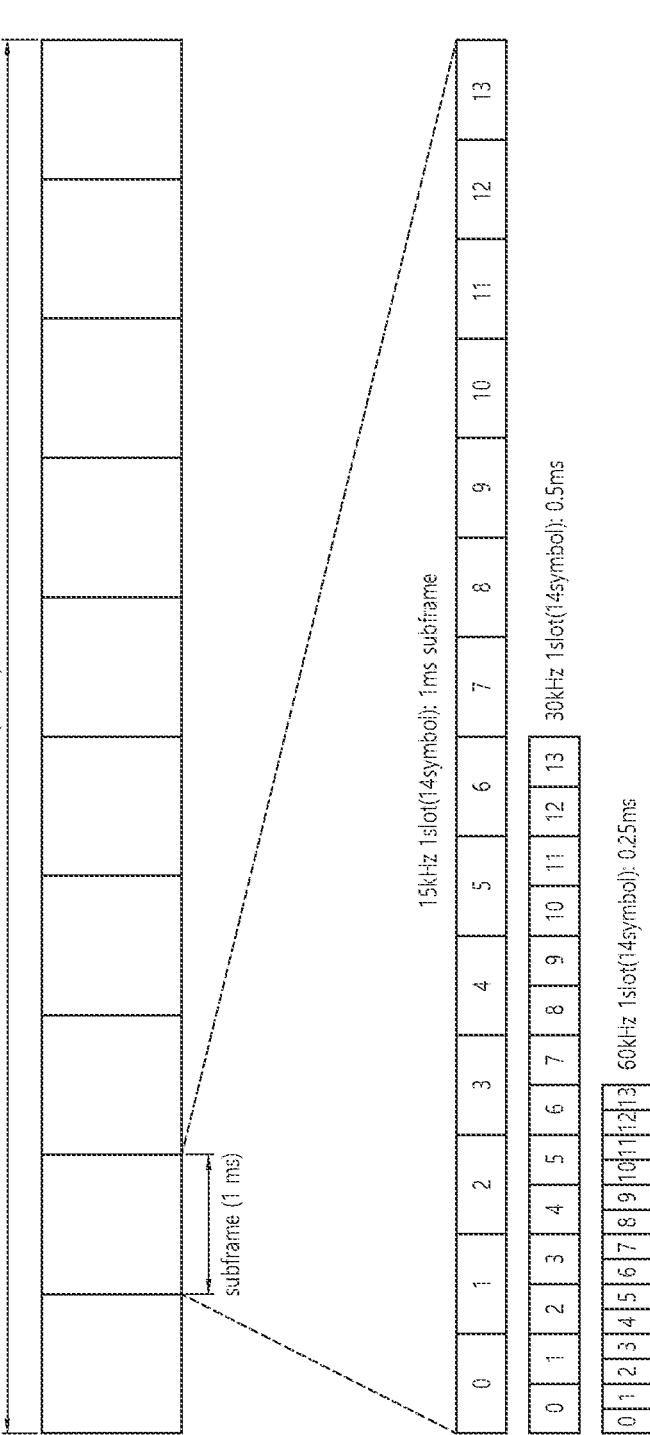
FIG. 3 illustrates a frame structure applicable in NR.

FIG. 3 illustrates a frame structure applicable in NR.

Referring to FIG. 3, a frame may consist of 10 milliseconds (ms) and may include 10 subframes of 1 ms.

A subframe may include one or a plurality of slots according to subcarrier spacing.

Table 1 below shows subcarrier spacing configuration

TABLE 1

| μ | $\Delta f = 2^\mu \cdot 15$ [kHz] | CP(Cyclic Prefix) |
|---|---|---|
| 0 | 15 | Normal |
| 1 | 30 | Normal |
| 2 | 60 | Normal, Extended |
| 3 | 120 | Normal |
| 4 | 240 | Normal |

Table 2 below shows the number of slots in a frame ($N^{frame,\mu}_{slot}$), the number of slots in a subframe ($N^{subframe,\mu}_{slot}$), and the number of symbols in a slot ($N^{slot}_{symb}$) according to the subcarrier spacing configuration μ.

TABLE 2

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

FIG. 3 shows μ=0, 1, and 2. A physical downlink control channel (PDCCH) may include one or more control channel elements (CCEs) as shown in Table 3 below.

TABLE 3

| Aggregation level | Number of CCEs |
|---|---|
| 1 | 1 |
| 2 | 2 |
| 4 | 4 |
| 8 | 8 |
| 16 | 16 |

In other words, the PDCCH may be transmitted through a resource including 1, 2, 4, 8 or 16 CCEs. Here, the CCE includes six resource element groups (REGs), and one REG includes one resource block in the frequency domain and one orthogonal frequency division multiplexing (OFDM) symbol in the time domain. The following technologies/characteristics may be applied to NR. <Self-contained subframe structure>

Figure 4:
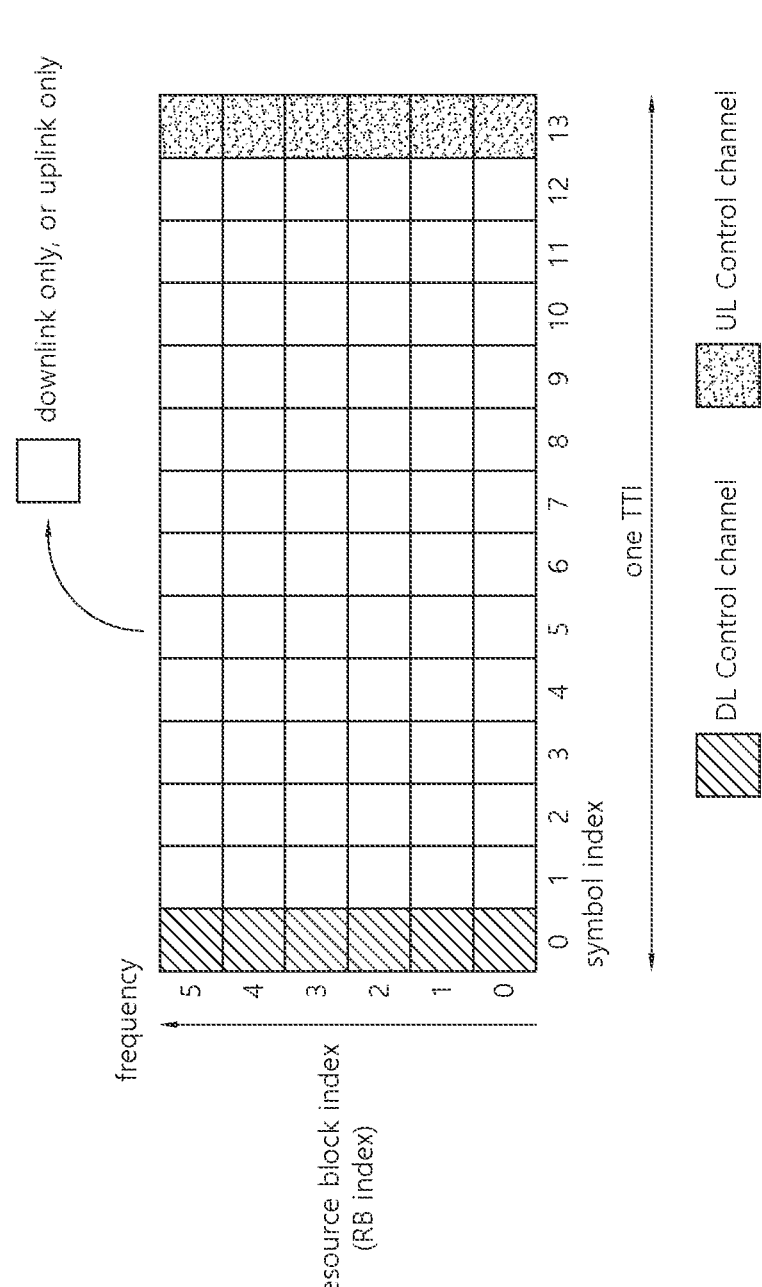
FIG. 4 illustrates an example of a frame structure for the new radio access technology (new RAT).

FIG. 4 illustrates an example of a frame structure for the new radio access technology (new RAT).

In NR, as a purpose for minimizing latency, as shown in FIG. 4, a structure having a control channel and a data channel being processed with Time Division Multiplexing (TDM), within one TTI, may be considered as one type of frame structure.

In FIG. 4, an area marked with slanted lines represents a downlink control area, and an area marked in black represents an uplink control area. An area marked in black may be used for downlink (DL) data transmission or may be used for uplink (UL) data transmission. The characteristic of such structure is that, since downlink (DL) transmission and uplink (UL) transmission are carried out sequentially, DL data is sent out (or transmitted) from a subframe, and UL Acknowledgement/Not-acknowledgement (ACK/NACK) may also be received in the subframe. As a result, time needed until data retransmission, when a data transmission error occurs, may be reduced, and, accordingly, latency in the final data transfer (or delivery) may be minimized.

In the above-described data and control TDMed subframe structure, a time gap is needed for a transition process (or shifting process) from a transmission mode to a reception mode of the base station and UE, or a transition process (or shifting process) from a reception mode to a transmission mode of the base station and UE. For this, in a self-contained subframe structure, some of the OFDM symbols of a time point where a transition from DL to UL occurs may be configured as a guard period (GP).

Figure 5:
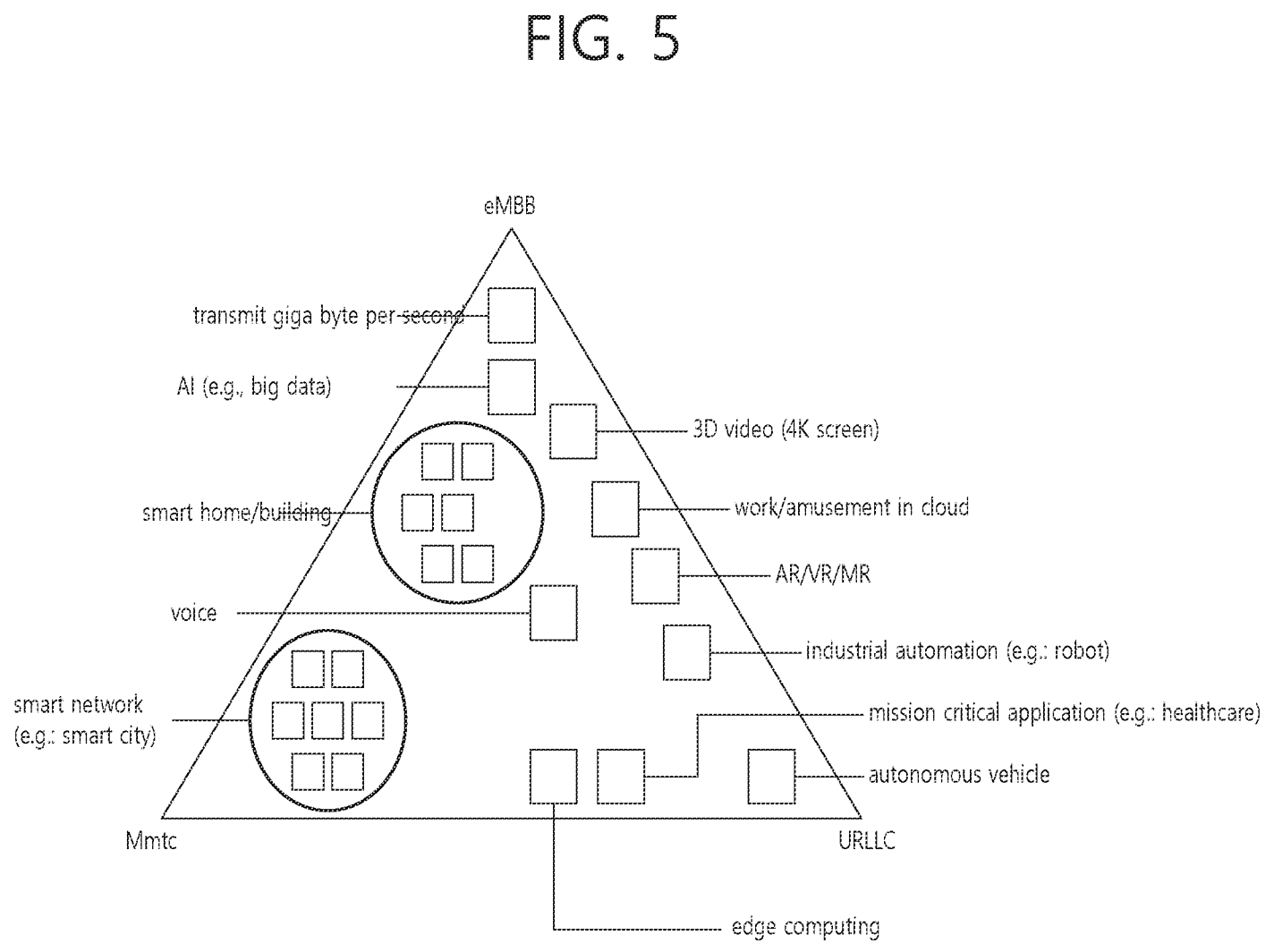

FIG. 5 shows examples of 5G usage scenarios to which the technical features of the present specification can be applied. The 5G usage scenarios shown in FIG. 5 are only exemplary, and the technical features of the present specification can be applied to other 5G usage scenarios which are not shown in FIG. 5.

Referring to FIG. 5, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km$^2$. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drone control and coordination.

Next, a plurality of use cases included in the triangle of FIG. 5 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location-based information systems. Use cases of logistics and freight tracking typically require low data rates, but require a large range and reliable location information.

Figure 6:
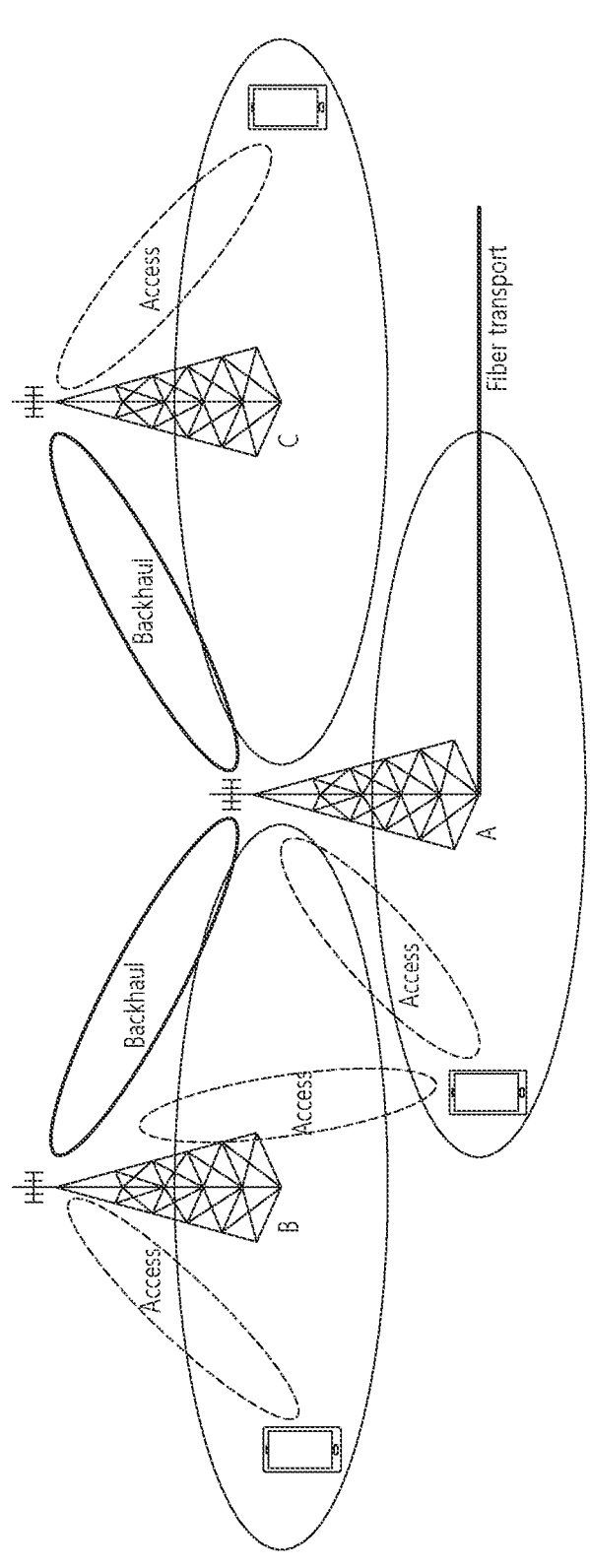
FIG. 6 schematically illustrates an example of integrated access and backhaul links.

FIG. 6 schematically illustrates an example of integrated access and backhaul links.

An example of a network having such integrated access and backhaul links is shown in FIG. 6. Here, a relay node (rTRP) can multiplex access and backhaul links in time, frequency or space (e.g., beam based operation).

Operations of different links may be at the same frequency or different frequencies (which may also be referred to as "in-band" and "out-band" relays). Although efficient support of the out-band relay is important in some NR deployment scenarios, it is very important to understand in-band operation requirements that mean a close interaction with an access link operating at the same frequency in order to accept duplex constraint and prevent/mitigate interference.

In addition, operation of an NR system in mmWave spectrum can present some unique challenges including experiencing serious short-term blocking that may not be easily mitigated by a current RRC based handover mechanism due to a larger time scale necessary to complete a procedure than short-term blocking.

To overcome short-term blocking in the mmWave system, a fast RAN based mechanism (which does not necessarily require intervention of a core network) for switching between rTRPs.

Necessity for mitigating short-term blocking for NR operation in the mmWave spectrum along with requirement for easier deployment of a self-backhauled NR cell may cause necessity of development of an integrated framework that enables rapid switching of access and backhaul links.

In addition, over-the-air (OTA) coordination between rTRPs can be regarded as mitigation of interference and support of end-to-end route selection and optimization.

The following requirements and aspects may need to be solved by integrated access and backhaul (IAB) for NR.

Efficient and flexible operation for in-band and out-band relays in indoor and outdoor scenarios Multiple hops and redundant connection End-to-end route selection and optimization Support of backhaul link with high spectrum efficiency Legacy NR UE support Legacy new RAT was designed to support half-duplex devices. Further, half-duplex of an IAB scenario deserves to be supported and to become an object. In addition, a full-duplex IAB device can be researched.

In the IAB scenario, a donor gNB (DgNB) needs to schedule all links between related relay nodes (RNs) and UEs unless each RN has scheduling capability. In other words, the DgNB can collect traffic information in all related RNs, determine schedules with respect to all links and then notify each RN of schedule information.

Figure 7:
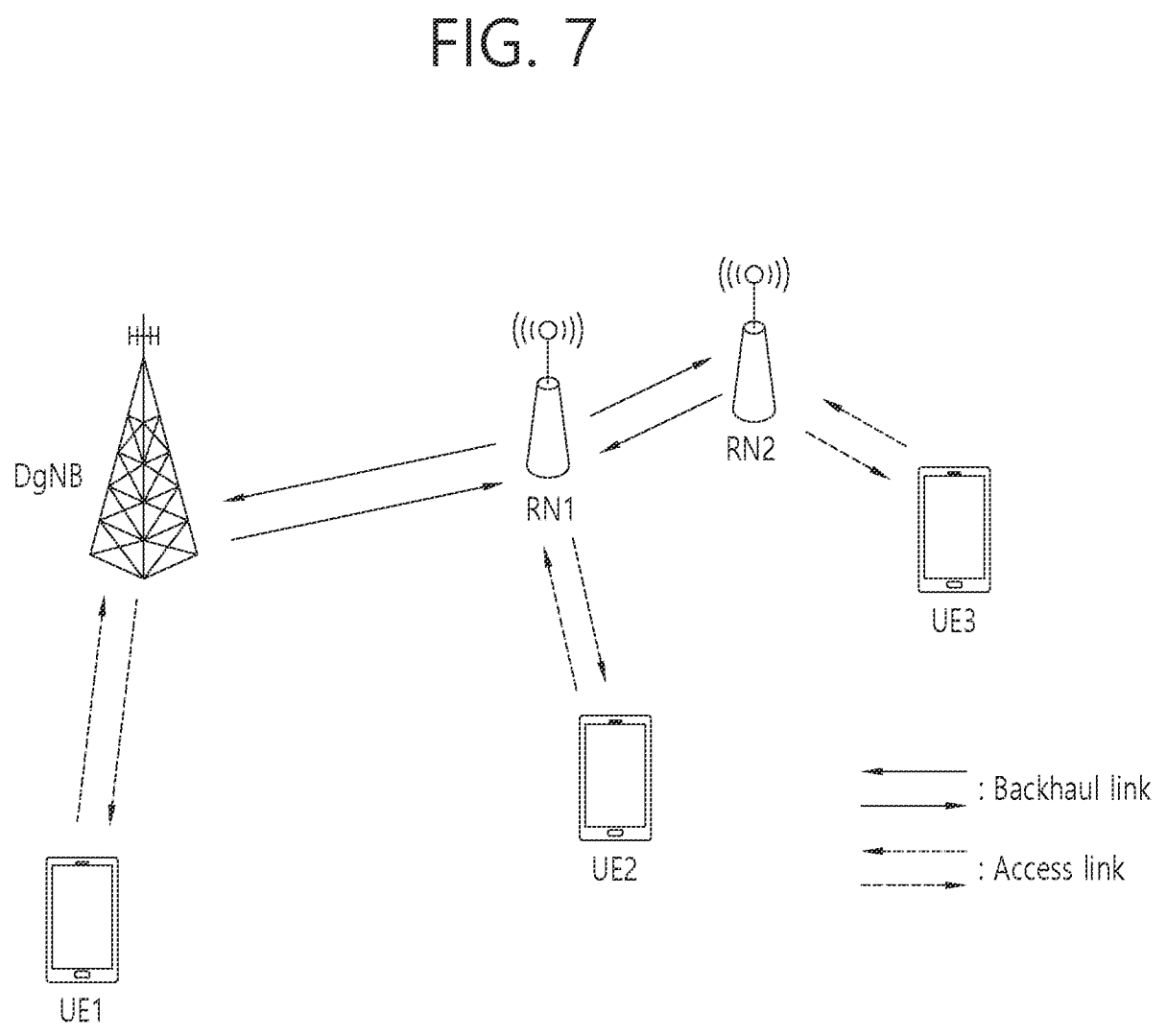

FIG. 7 schematically illustrates an example of a link between a DgNB, an RN, and a UE.

According to FIG. 7, for example, a link between DgNB and UE1 is an access link (access link), a link between RN1 and UE2 is also an access link, and a link between RN2 and UE3 may also mean an access link.

Similarly, according to FIG. 7, for example, a link between DgNB and RN1 and a link between RN1 and RN2 may mean a backhaul link.

For example, backhaul and access links can be configured, and in this case, the DgNB can receive scheduling requests of UE 2 and UE 3 as well as a scheduling request of UE 1. Then, the DgNB can determine scheduling of two backhaul links and three access links and signal the scheduling result. Accordingly, this centralized scheduling includes delayed scheduling and waiting time problems.

On the other hand, distributed scheduling can be performed if each RN has scheduling capability. Then, immediate scheduling can be performed for an uplink scheduling request of a UE and backhaul/access links can be used more flexibly in response to surrounding traffic conditions.

Figure 8:
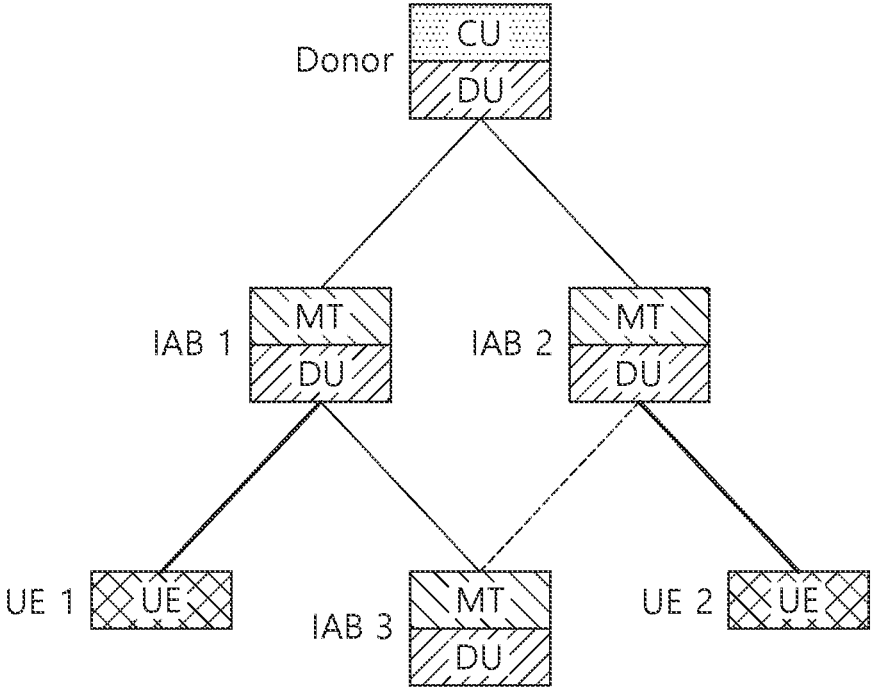
FIG. 8 schematically shows an example of a backhaul link and an access link.

FIG. 8 schematically shows an example of a backhaul link and an access link.

As shown in FIG. 8, a link between a donor node and an IAB node or a link between IAB nodes is called a backhaul link. On the other hand, the link between the donor node and the UE or the link between the IAB node and the UE is called an access link. That is, a link between an MT and a parent DU or a link between a DU and a child MT may be referred to as a backhaul link, and a link between the DU and the UE may be referred to as an access link.

Hereinafter, the proposal of the present specification will be described.

Figure 9:
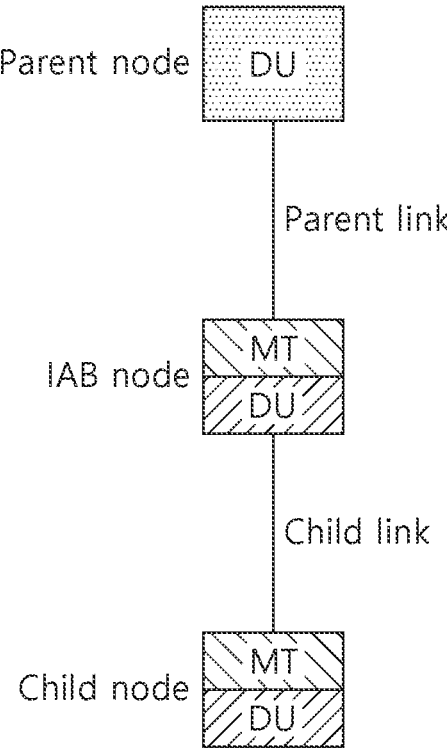
FIG. 9 schematically illustrates an example of a parent link and a child link.

In the existing IAB node, the DU and the MT performed TDM operation through different time resources. On the other hand, it is required to perform resource multiplexing such as SDM/FDM and full duplexing (FD) between the DU and the MT for efficient resource management. The link between the IAB node (IAB MT) and the parent node (parent DU) is referred to as a parent link, as shown in FIG. 9 below, a link between an IAB node (IAB DU) and a child node (child MT) is called a child link. At this time, the TDM operation between the parent link and the child link may be discussed, and the SDM/FDM and FD operation may also be discussed.

FIG. 9 schematically illustrates an example of a parent link and a child link.

As shown in FIG. 9, the link between the IAB node and the parent node is called the parent link, the link between the IAB node and the child node/UE is called the child link. That is, the link between the MT and the parent DU is called a parent link, and the link between the DU and the child MT/UE is called a child link.

However, depending on the interpretation or perspective, the link between the IAB node and the parent node is called a backhaul link, and the link between the IAB node and the child node/UE is also called an access link.

The Tx/Rx timing alignment method of the IAB node that can be considered in the IAB environment may be as follows.

Figure 10:
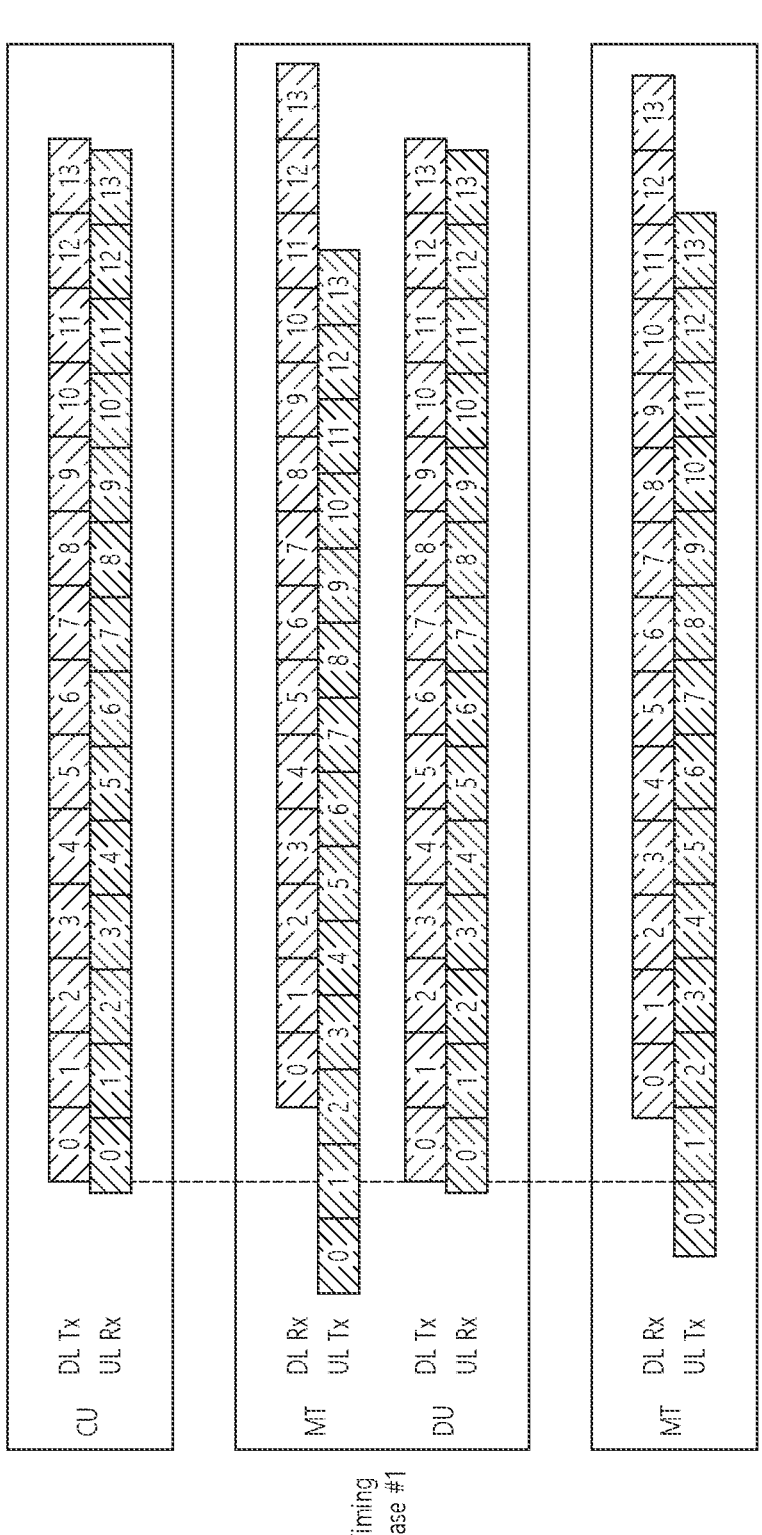
FIG. 10 schematically shows an example of timing alignment case 1.

FIG. 10 schematically shows an example of timing alignment case 1.

Timing alignment case 1

DL transmission timing alignment across IAB-node(s) and IAB-donor(s). This is a method in which the DL Tx timing of DUs between IAB nodes is aligned, and is a timing alignment method used by Rel-16 IAB nodes.

If DL TX and UL RX are not well aligned at the parent node, additional information about the alignment is needed for the child node to properly set its DL TX timing for OTA based timing & synchronization.

MT Tx timing may be expressed as MT Rx timing—TA, the DU Tx timing may be expressed as MT Rx timing—TA/2—T_delta. The T_delta value is a value obtained from the parent node.

Figure 11:
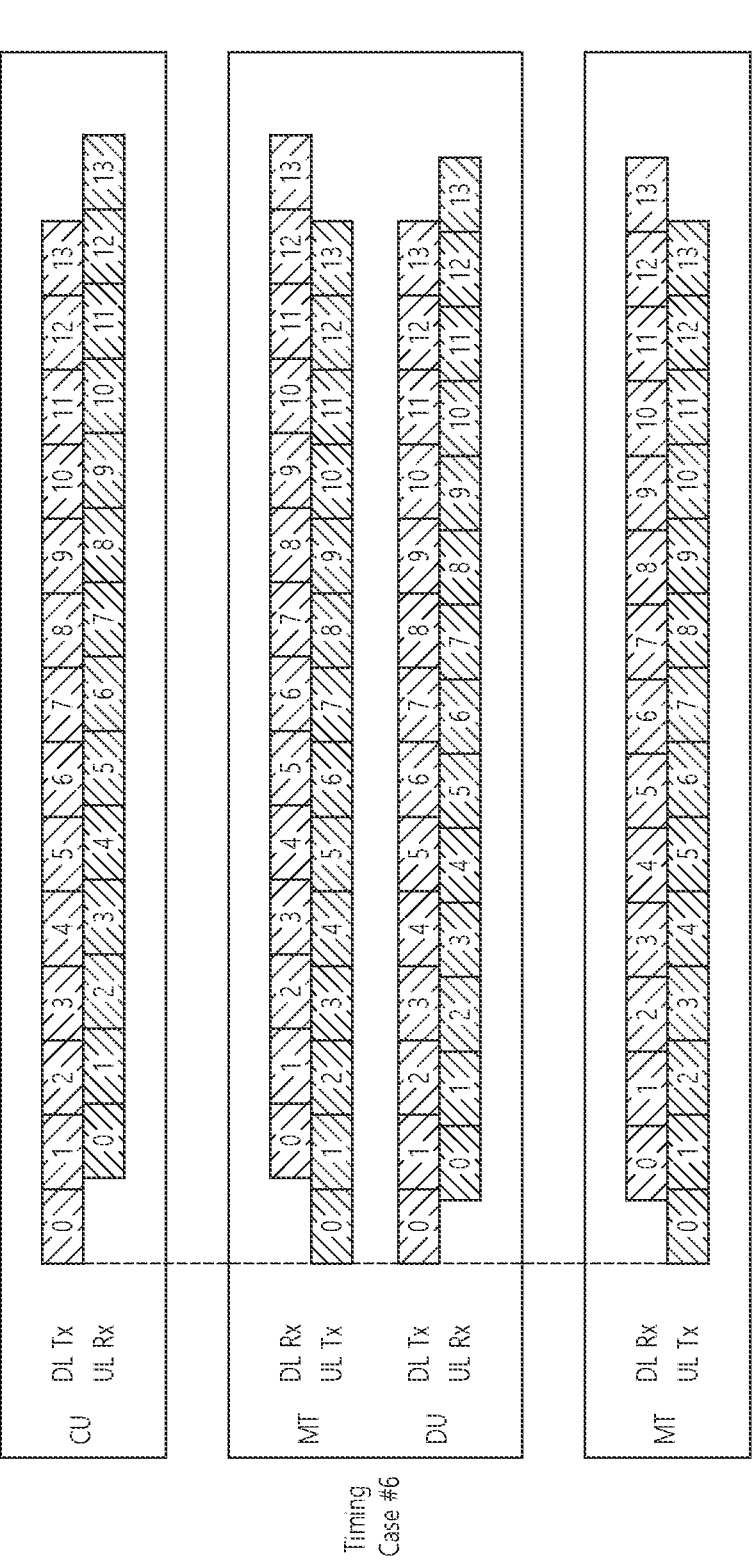
FIG. 11 schematically shows an example of timing alignment case 6.

FIG. 11 schematically shows an example of timing alignment case 6.

Timing alignment case 6

The DL transmission timing for all IAB-nodes is aligned with the parent IAB-node or donor DL timing. The UL transmission timing of an IAB-node can be aligned with the IAB-node's DL transmission timing.

This is a method in which the MT UL Tx timing and the DU DL Tx timing of the IAB node are aligned.

Since the UL Tx timing of the MT is fixed, the UL Rx timing of the parent DU receiving it is delayed by the propagation delay of the parent DU and the MT compared to the UL Tx timing of the MT. The UL Rx timing of the MT varies according to the child MT that transmits the UL. When the IAB node uses the timing alignment case 6, since the UL Rx timing of the parent node is different from the existing one, if the IAB node wants to use the timing alignment case 6, the parent node also needs to know the corresponding information.

Figure 12:
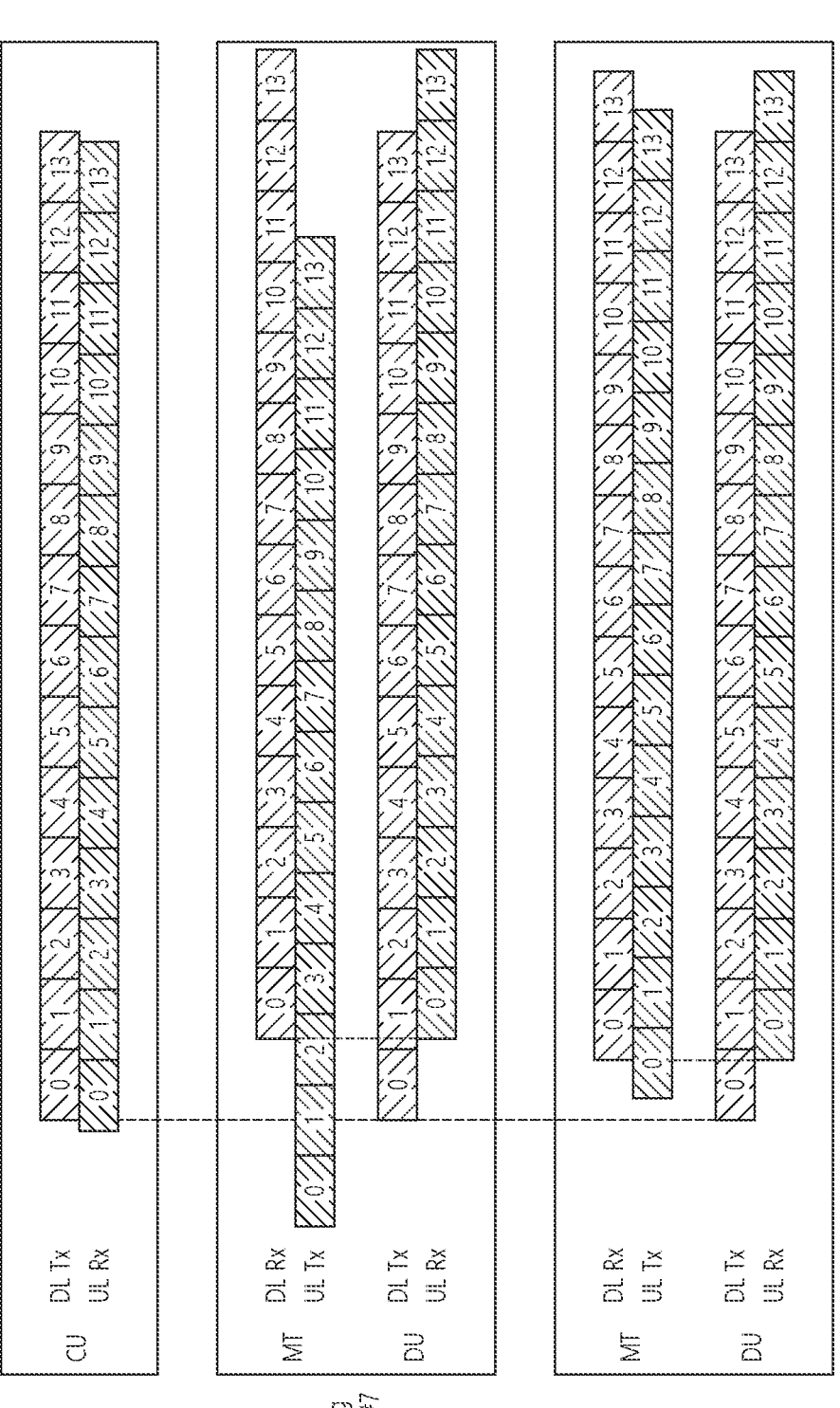
FIG. 12 schematically shows an example of the timing alignment case 7.

FIG. 12 schematically shows an example of the timing alignment case 7.

Timing alignment case 7

The DL transmission timing for all IAB-nodes is aligned with the parent IAB-node or donor DL timing. The UL reception timing of an IAB-node can be aligned with the IAB-node's DL reception timing.

If DL TX and UL RX are not well aligned at the parent node, additional information about the alignment is needed for the child node to properly set its DL TX timing for OTA based timing & synchronization.

This is a method in which the MT DL Rx timing and the DU UL Rx timing of the IAB node are aligned.

The transmission/reception timing from the MT perspective is the same as that of the existing IAB node (Rel-16 IAB node), the UL Rx timing of the DU may be aligned with the DL Rx timing of the MT. The IAB node needs to adjust the TA of the child MTs so that the child MTs transmit UL signals according to their UL Rx timing.

Therefore, this timing alignment method may not reveal a difference in the specification operation of the IAB node compared to the existing timing alignment method (case 1). Accordingly, the timing alignment case 7 described herein may be replaced/interpreted as the timing alignment case 1.

Examples for timing alignment cases 1, 6, and 7 are shown in FIGS. 10 to 12, respectively.

In this specification, timing alignment may mean slot-level alignment or symbol-level alignment.

Additional advantages, objects and features of this specification will be set forth in part in the description that follows, and in part will become apparent to those skilled in the art upon review of the following, and may be learned from practice of the specification. The objects and other advantages of the present specification may be realized and attained by the structure particularly pointed out in the description and claims set forth herein, as well as in the appended drawings.

The configuration, operation and other features of the present specification will be understood by the embodiments of the present specification described with reference to the accompanying drawings.

The content of the present specification is described assuming an in-band environment, but may also be applied in an out-band environment. In addition, the content of the present specification is described in consideration of an environment in which a donor gNB (DgNB), a relay node (RN), and a UE perform a half-duplex operation, the contents of the present specification may be applied even in an environment in which a donor gNB (DgNB), a relay node (RN), and/or a UE perform a full-duplex operation.

Meanwhile, various multiplexing options for MT and DU may be discussed. For example, (in IAB WI) asynchronous operation between the MT and the DU may be provided. In addition, simultaneous operation between MT and DU can be provided (in IAB enh WI) to increase spectral efficiency and reduce latency.

In this case, the resource multiplexing between the MT and the DU will be described with reference to the drawings as follows.

Figure 13:
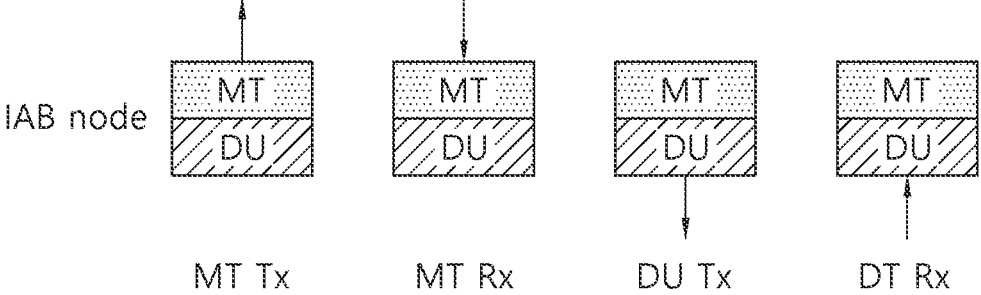
FIGS. 13 and 14 schematically show an example of resource multiplexing between an MT and a DU.
Figure 14:
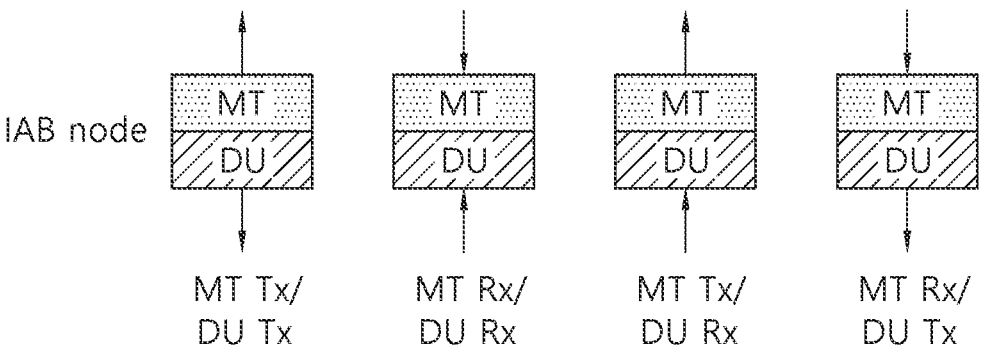

FIGS. 13 and 14 schematically show an example of resource multiplexing between an MT and a DU.

In the case of asynchronous operation, as shown in FIG. 13, the MT and DU may operate in a TDM manner under the per-link half-duplex constraint. And, in the case of simultaneous operation, the MT and the DU may simultaneously perform Tx and/or Rx as shown in FIG. 14.

Meanwhile, the following features may be provided with respect to spatial domain multiplexing (SDM) between the DU and the MT of the IAB node.

First, it may be provided for whether to manage/how to manage a resource in a spatial domain. At this time, the candidate solution may be as follows, and the contents below are only examples. That is, other solutions may also be provided.

Dynamic signal between parent node and child node for antenna panel/beam use/limit/share.

Multi-panel enhancements for beam management/simultaneous operation.

Extend the H/S/NA resource display to the spatial domain.

As well as, dynamic indications (upstream and/or downstream directions) of limit/use/availability of beams may be supported to facilitate concurrent operation and interference management. An example at this time may be as follows, the contents below are merely examples. That is, other examples may also be provided.

Applicable to specific multiplexing cases or specific time-frequency resources.

Whether IAB-related enhancements beyond the existing beam management framework are required to support the functionality.

Impact on semi-static resource configuration (eg extending H/S/NA resource attributes to spatial domain).

Whether to support additional panel-based granularity.

Here, in the case of simultaneous transmission (DU DL-Tx/MT UL-Tx) or simultaneous reception (DU UL-Rx/MT DL-Rx) operation between DU and MT of the IAB node, interference between multiple beams may occur. It may be desirable to use a method of reducing inter-layer interference using beams in which the DU and the MT are orthogonal to each other.

In this case, the operation of the parent DU to dynamically control the beam resource of the DU may be undesirable. This is because the scheduling target for the child link of the IAB node is the DU, and the parent node cannot accurately know the beam direction required for the DU.

Instead, it may be preferable for the parent DU to determine and instruct the MT beam based on information on a desired beam direction from the IAB node. To this end, the parent DU may need shared information about the beam pair(s) capable of simultaneously operating between the DU and the MT of the IAB node.

In case of simultaneous transmission, the IAB node may report information about the pair(s) between the MT UL-Tx beam and the DU DL-Tx beam to the parent DU. As an example, the MT may report the SRI as information on the UL-Tx beam used for the time resource of simultaneous transmission. Based on the reported SRI to aid in simultaneous Tx operation between the MT and the DU of the IAB node, the parent DU may direct the MT's UL transmission.

In case of simultaneous reception, the IAB node may report information about the pair(s) between the MT DL-Rx beam and the DU UL-Rx beam to the parent DU. For example, the MT may report TCI-RS information to the parent DU as information on a DL-Rx beam used for a time resource of simultaneous reception. Then, based on the reported TCI-RS information to help the simultaneous Rx operation between the DU of the IAB node and the MT, the parent DU may indicate the TCI state and QCL condition for DL reception to the MT.

In addition, considering the difficulty and overhead of dynamic information sharing for the desired beam pair of the IAB node, it may be considered that the beam pair that the IAB node can use is limited according to the frequency resource.

This mechanism can also be applied to the case of simultaneous transmission and reception between the MT and DU of the IAB node (DU DL-Tx/MT DL-Rx and DU UL-Rx/MT UL-Tx). As the IAB node reports a desired beam pair capable of reducing self-interference to the parent DU, the IAB node may perform effective simultaneous transmission/reception operation between the MT and the DU.

Considering the above operation, the present specification proposes the following contents.

Hereinafter, for a better understanding of the examples of the present specification, the disclosure of the present specification will be described with reference to the drawings. The following drawings were created to explain a specific example of the present specification. Since the names of specific devices described in the drawings or the names of specific signals/messages/fields are presented by way of example, the technical features of the present specification are not limited to the specific names used in the following drawings.

Figure 15:
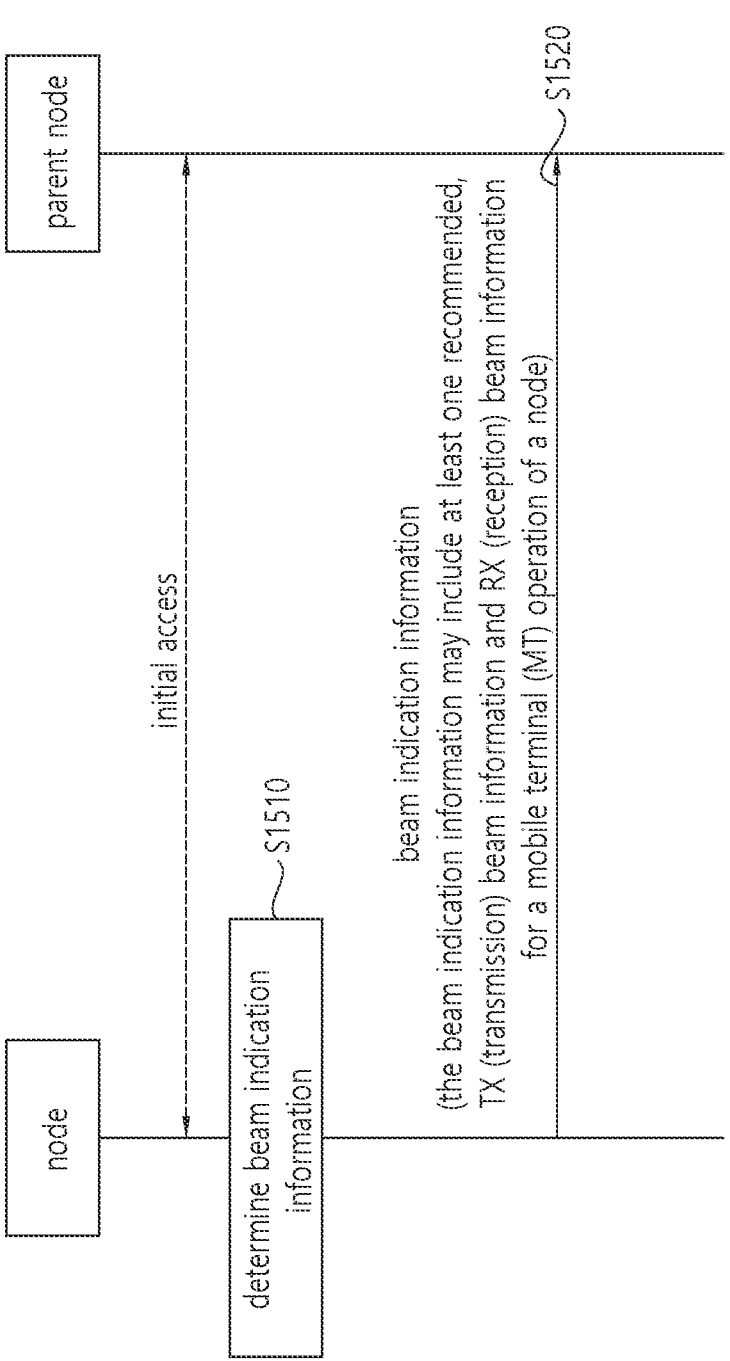
FIG. 15 is a flowchart of a method of transmitting beam indication information performed by a node according to an embodiment of the present specification.

FIG. 15 is a flowchart of a method of transmitting beam indication information performed by a node according to an embodiment of the present specification.

According to FIG. 15, a node may perform initial access with a parent node. Here, the node may correspond to, for example, an IAB node.

The node may determine beam indication information (S1510). Here, the beam indication information may include at least one recommended, TX (transmission) beam information and RX (reception) beam information for a mobile terminal (MT) operation of a node.

Thereafter, the node may transmit beam indication information to the parent node (S1520). In this case, the beam indication information may be transmitted from the node to the parent node through, for example, MAC CE signaling.

In other words, in order to support determining the MT beam and instructing the node based on the information on the beam direction desired by the parent node, the node may transmit information about a desired beam direction (eg, beam indication information) to the parent node.

For a smoother understanding of FIG. 15, a method for a node to transmit beam indication information to a parent node will be described in more detail. In addition, specific features that can be operated together (or separately) with the operation of the node transmitting beam indication information to the parent node will also be described.

A. Operation of Reporting desired Beam Pair Information Capable of Simultaneous Operation between the DU and the MT of the IAB Node The IAB node may report information on beam resources of DUs and MTs capable of simultaneous operation to a parent node and/or a donor node (/CU).

At this time, in this specification, the Tx/Rx beam resources of the DU and the MT may specifically mean the following.

The Tx/Rx beam resource of DU is i. It may mean an arbitrary spatial (beam) resource index. The DU links the Tx/Rx beam resource applied to it for each spatial (beam) resource index, it is possible to report whether simultaneous operation of the corresponding resource is possible (or not).

ii. The Tx/Rx beam resource of the DU may mean a DL panel ID and a UL panel ID.

iii. Alternatively, the Tx beam resource of the DU may mean a DL RS ID such as an SSB ID and/or a CSI-RS ID.

iv. It may be information about the actual beam direction transmitted by the DU. For example, it may be azimuth/elevation angle information of the beam resource, individual angle information, angle range which are transmitted by the parent DU for each beam resource and/or alpha, beta, gamma values which are a translation parameter of the LCS-GCS of the beam resource transmitted by the DU.

v. When creating a codebook of the (analog) beam transmitted by the DU, it may mean a codebook index.

MT's Tx beam resource is i. It may mean a spatial (relation) RS.

ii. It may mean the UL panel ID of the MT.

iii. It may mean SRI.

iv. It may be information about the actual beam direction transmitted by the MT. For example, this is the azimuth/elevation angle information of the beam resource, individual angle information, angle range transmitted by the parent MT for each beam resource and/or it may be an alpha, beta, or gamma value that is a transformation parameter of the LCS-GCS of the beam resource transmitted by the MT.

v. When creating a codebook of the (analog) beam transmitted by the MT, it may mean a codebook index.

At this time, the Rx beam resource of the MT is i. It may mean a DL RS ID based on a resource set configured for beam management.

ii. It may mean the DL panel ID of the MT.

iii. It may mean QCL Type-D RS.

iv. It may mean TCI state and QCL condition for DL reception.

v. It may be information about the actual beam direction transmitted by the parent DU.

For example, it may be the azimuth/elevation angle information of the beam resource individual angle information, angle range transmitted by the parent DU for each beam resource and/or it may be an alpha, beta, or gamma value that is a transformation parameter of the LCS-GCS of the beam resource transmitted by the parent DU.

vi. When the codebook of the (analog) beam transmitted by the parent DU exists, it may mean a codebook index.

In this case, specifically, the IAB node may report the following information to the parent DU for simultaneous operation between its MT and the DU.

1) It is possible to report whether simultaneous operation between the DU and the MT is possible according to the Tx/Rx beam of the DU or the beam group. In this case, it is possible to additionally report desired DU Tx/Rx beam (s) or beam group (s) information of a DU that the IAB node intends to use according to time/frequency resources.

Based on this information, the parent DU may determine whether simultaneous operation of the IAB node in a specific resource is possible and whether transmission/reception with the IAB-MT is possible, and may perform scheduling to the IAB-MT.

2) It is possible to report whether simultaneous operation between the DU and the MT is possible according to the Tx/Rx beam or beam group of the MT. Information on the Tx/Rx beam or beam group of the MT capable of simultaneous operation between the DU and the MT may be reported. In this case, information on a desired MT Tx/Rx beam (s) or beam group (s) of an MT that the IAB node intends to use may be additionally reported according to time/frequency resources.

Based on this information, the parent DU determines whether transmission/reception is possible with the IAB-MT in a specific resource, and the parent DU determines a Tx/Rx beam resource that can be transmitted/received, the parent DU may perform scheduling to the IAB-MT based on the corresponding beam resource.

3) Information on a pair of Tx/Rx beams or beam groups of DUs and MTs capable of simultaneous operation between DUs and MTs may be reported. To this end, information on the Tx/Rx beam (s) or beam group (s) of the MT paired for each Tx/Rx beam (s) or beam group (s) of the DU may be reported. Alternatively, information on the Tx/Rx beam (s)

or beam group (s) of the DU paired for each Tx/Rx beam (s) or beam group (s) of the MT may be reported. In this case, information on a desired Tx/Rx beam or a pair (s) of a beam group to be used by the IAB node may be additionally reported according to time/frequency resources.

Based on this information, the parent DU determines whether transmission/reception is possible with the IAB-MT in a specific resource, and the parent DU determines a Tx/Rx beam resource that can be transmitted/received, it may perform scheduling to the IAB-MT based on the corresponding beam resource.

The report as described above may be relatively semi-statically transmitted from the IAB node to the parent node/donor node (CU) through RRC/F1-AP or the like. Alternatively, it may be transmitted from the IAB node to the parent node through MAC CE or PUCCH (UCI). Information on beams or beam groups of DUs and/or MTs capable of simultaneous operation between DUs and MTs or information on beams or beam group pairs of DUs and MTs is semi-statically transmitted from the IAB node to the parent node/donor node (CU) through RRC/F1-AP, etc. Information on the index of the desired DU/MT beam or beam group that the IAB node intends to use according to the time/frequency resource or the index of the desired beam pair between the MT and the DU can be dynamically transmitted through MAC CE or UCI.

B. Operation of Limiting Beam Resources Usable by MTs and/or DUs according to Time/Frequency Resources of DUs and MTs IAB nodes can be configured information on beams or beam groups in which DUs and/or MTs can be used/impossible or beam pairs in which DUs and MTs can be used are displayed According to the time/frequency resource region of the DU from the network (parent node and/or donor node (DU)). Or/and, IAB nodes can be configured information on beams or beam groups in which DUs and/or MTs are available/impossible or beam pairs in which DUs and MTs can be used according to the time/frequency resource region of the MT from the network (parent node and/or donor node (DU)). These configurations may be more specifically as follows.

When dividing the time and/or frequency resource region of the DU into a plurality of sub-groups, information on Tx/Rx beams, beam groups, or beam pairs usable or unavailable by the DU (and/or MT) for each region is configured.

As above, based on information about a beam, a beam group, or a beam pair, etc., available/unable to be used by the MT and/or DU, it can determine its own Tx/Rx beam resource as the usable beam resource.

The parent DU may also receive this information to be shared. Through this, it determines available/unusable beam resources when transmitting and receiving with the IAB node in a specific resource, based on this, a beam resource may be determined and transmission/reception may be performed.

C. Operation of MT and DU when the Beam Direction of the MT Indicated by the Parent Node cannot be Operated at the same Time The parent DU may determine/apply a beam resource to be used for transmission/reception to the MT based on the same information as in sections A and B above.

The DU may determine/apply a beam resource to be used by the DU for transmission/reception with a child MT/UE so that simultaneous operation between the MT and the DU is possible in consideration of the beam resource of the MT instructed by the parent DU.

In this case, the Tx/Rx beam resource of the MT scheduled by the parent DU may deviate from the desired Tx/Rx beam resource of the MT expected by the IAB node. Therefore, when MT transmission/reception is performed by applying the beam resource of the MT scheduled by the parent DU, simultaneous operation between the MT and the DU may be difficult. If the IAB node wants to perform simultaneous operation as MT and DU, but it is difficult to perform simultaneous operation for this reason, the IAB node may operate as follows.

Alt 1. Scheduling from the parent DU is prioritized, and the DL Rx beam/UL Tx beam resource of the MT is determined according to information indicated by the parent DU. In this case, if simultaneous operation between the MT and the DU is impossible in the corresponding time/frequency resource, MT transmission/reception is performed without performing DU transmission/reception in the corresponding resource.

Alt 2. Scheduling from the parent DU is prioritized, and the DL Rx beam/UL Tx beam resource of the MT is determined according to information indicated by the parent DU. In this case, since the simultaneous operation between the MT and the DU is impossible, the FDD and/or TDD operation may be performed.

When performing TDD operation on the resource, in consideration of the time domain H/S/NA configuration in the corresponding time resource, transmission/reception to one of the MT and the DU may be performed.

When performing FDD operation on the resource, in consideration of the frequency domain H/S/NA configuration in the corresponding frequency resource, one of the MT and the DU may be transmitted/received.

Alt 3. Overriding the information reported by the IAB node to the parent DU, even if there is a deviation from the DL Rx beam/UL Tx beam resource of the MT indicated by the parent DU, MT transmission/reception is performed using the MT's Tx/Rx beam resource capable of simultaneous operation between the MT and the DU.

D. Determination of Beam Resources According to Frequency Domain H/S/NA Configuration Meanwhile, the node may receive configuration information for a frequency resource from a parent node (and/or a donor node/CU), and perform an IAB operation based thereon.

Figure 16:
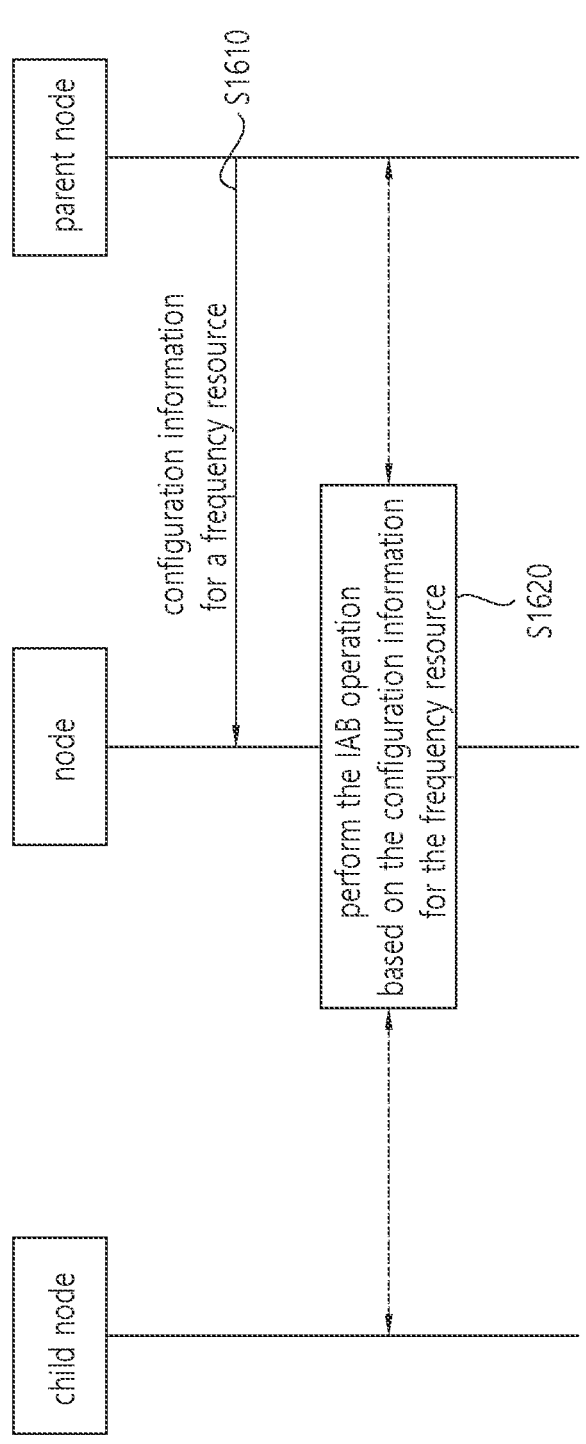
FIG. 16 is a flowchart of an example of receiving configuration information for a frequency resource.

FIG. 16 is a flowchart of an example of receiving configuration information for a frequency resource. The example of FIG. 16 may be combined with the examples described above. In addition, the example of FIG. 16 may operate separately from the examples described above.

According to FIG. 16, a node may receive configuration information for a frequency resource from a parent node (and/or a donor node/CU) (S1610).

Thereafter, the node may perform the IAB operation based on the configuration information for the frequency resource (S1620). This can be described in more detail as follows.

The IAB-DU may receive H (hard), S (soft), and/or NA (not available) information for frequency resources configured from the donor node/CU. Specifically, the H, S, and NA resources may mean the following.

Hard: It means a frequency resource on which the DU can transmit and receive.

NA: It refers to a frequency resource in which the DU cannot perform transmission/reception.

Soft: As a frequency resource for which transmission/reception of DU is not determined, by additional instructions or whether or not IAB-MT is used, it refers to a resource in which whether DU transmission and reception is possible is dynamically and explicitly and/or implicitly determined.

The IAB-DU may perform transmission/reception in a hard-configured frequency resource. In this frequency resource, the IAB-MT operating as FDM with the IAB-DU does not perform transmission/reception.

The IAB-DU does not transmit/receive in a frequency resource set to NA. In this frequency resource, the IAB-MT operating in FDM with the IAB-DU may perform transmission/reception.

When the IAB-DU is indicated that the frequency resource set to soft is available by additional signaling, transmission and reception can be performed on the corresponding resource. Or even if the soft-configured frequency resource is not indicated to be available by additional signaling, IAB-DU may perform transmission/reception if the resource does not interfere with transmission/reception of IAB-MT. In this frequency resource, if the IAB-MT operating in FDM with the IAB-DU is indicated to be available to the DU by additional signaling, transmission and reception are not performed. Otherwise, the IAB-MT may use the corresponding frequency resource for transmission and reception. In this case, additional signaling indicating the availability of the DU soft resource will be called a frequency-domain availability indication.

Meanwhile, the following content may be provided for simultaneous operation using SDM between the MT and the DU of the IAB-node.

In case of MT/DU simultaneous operation,

The parent node can dynamically instruct the child node to at least a limited set of beams in the child node's IAB-DU.

The child node may dynamically report the recommendation beam(s), or the non-preferred beam(s), or both the recommendation beam(s) and the non-preferred beam(s) of the IAB-MT of the child node to the parent node. Here, whether all reporting combinations are supported may also be provided.

Applicability to a specific multiplexing case or a specific time-frequency resource may be provided.

Additional semi-static signals may be provided.

In addition to the granularity for each beam, the granularity for each panel may be provided.

A relationship between the child IAB-MT beam indication and the parent IAB-DU beam indication may be provided.

This may not exclude improvements to DU or MT-based CLI measurement and reporting.

Additionally, the following content may also be provided for simultaneous operation using SDM between the MT and the DU of the IAB-node.

First, spatial domain restrictions from parent nodes or recommendations from child nodes may be restricted to a subset of time resources to which simultaneous operations are applied.

Frequency resource processing may be provided during FDM operation.

Support for implicit/explicit indication of concurrent mode of operation may be provided.

In addition, the child node indication of the recommendation beam for the parent node may include both an IAB-MT DL beam and/or an IAB-MT UL beam.

Indication may be provided via MAC-CE or UCI transmission.

IAB-MT DL beam and/or IAB-MT UL beam definition (eg, TCI state ID, spatial relationship information ID, RS ID (including CSI-RS, SRS, SSB, etc.)) may be provided.

Whether to support display of "non-preferred" beams may be provided.

Even when the MT and DU of the IAB-node operate in SDM, frequency-domain H/S/NA configuration may be used. IAB-nodes are not always capable of operating with SDM, whether the SDM can operate may vary depending on the beam resource used by the MT and the DU. Considering this point, it can be considered to operate as follows.

(a) When the MT of the IAB-node performs Tx and/or Rx using beam directions in which the DUs can operate in SDM with each other, simultaneous operation between the MT and the DU may be performed regardless of the frequency-domain H/S/NA configuration. On the other hand, when the MT performs Tx and/or Rx using beam directions in which the DUs can operate in SDM with each other, frequency-domain H/S/NA configuration should be applied to operate as FDM using different frequency resources.

For this, when MT and DU simultaneously perform Tx in a specific time/frequency resource, when the beam resource used by the MT and the beam resource used by the DU are not mutually SDM-capable beam resources, according to frequency-domain H/S/NA configuration and frequency-domain availability indication of the corresponding frequency resource, only the DU or MT can perform transmission/reception.

(b) When a specific time/frequency resource is set to hard or when it is determined that the DU is an usable soft resource, the DU may perform transmission/reception in the corresponding resource without limiting the beam resource. In this case, when the MT is configured to perform transmission/reception using a beam resource that can operate by performing SDM with the beam direction of the DU in the corresponding resource, transmission and reception can be performed on the corresponding resource. On the other hand, when the MT is configured to perform transmission/reception using a beam resource that cannot operate by performing SDM with the beam direction of the DU in the corresponding resource, transmission and reception cannot be performed on the corresponding resource. In this case, the beam resource of the MT that can operate by performing SDM with the DU refers to a beam resource included in the recommended beam resource of the MT in which the IAB-node instructs the parent node to use SDM for operation.

When a specific time/frequency resource is set to NA or it is determined as a soft resource not used by DU, the MT may perform transmission/reception in the corresponding resource without limiting the beam resource. In this case, when the DU is configured to perform transmission/reception using a beam resource that can operate by performing SDM with the beam direction of the MT in the corresponding resource, transmission and reception can be performed on the corresponding resource. On the other hand, when the DU is configured to perform transmission/reception using a beam resource that cannot operate by performing SDM with the beam direction of the MT in the corresponding resource, transmission and reception cannot be performed on the corresponding resource. In this case, the beam resource of the DU capable of operating in SDM with the MT may be a beam resource included in the restricted beam resource configured to be used for SDM by the IAB-node by the parent node.

Hereinafter, the embodiments of the present specification will be described once again from the viewpoints of various subjects.

Hereinafter, for a better understanding of the examples of the present specification, the disclosure of the present specification will be described with reference to the drawings. The following drawings were created to explain a specific example of the present specification. The names of specific devices described in the drawings or the names of specific signals/messages/fields are presented by way of example, so that the technical features of the present specification are not limited to the specific names used in the following drawings.

Figure 17:
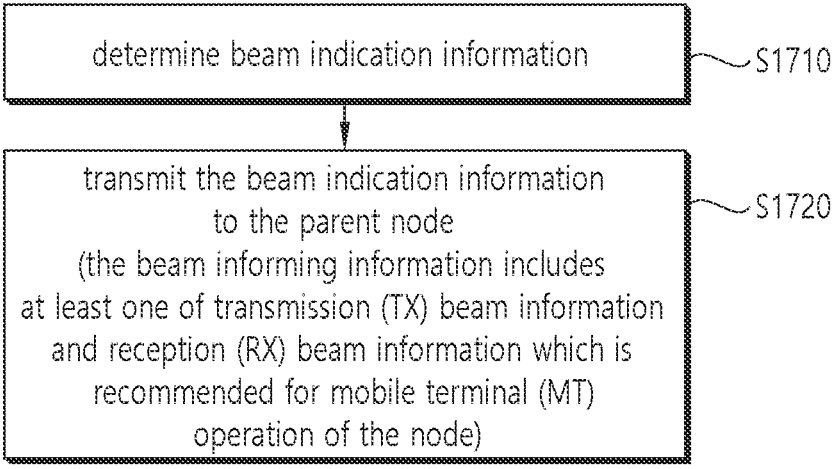
FIG. 17 is a flowchart of a method of transmitting beam indication information from a node's point of view, according to an embodiment of the present specification.

FIG. 17 is a flowchart of a method of transmitting beam indication information from a node's point of view, according to an embodiment of the present specification.

Referring to FIG. 17, the node may determine beam indication information (S1710).

Then, the node may transmit the beam indication information to the parent node (S1720).

Here, the beam informing information includes at least one of transmission (TX) beam information and reception (RX) beam information which is recommended for mobile terminal (MT) operation of the node.

For example, the beam informing information may include sounding reference signal resource indicator (SRI) information related to the TX beam information.

For example, the beam informing information may include reference signal (RS) ID information related to the RX beam information. Here, the beam informing information may include information for a transmission configuration indicator (TCI) state related to the RX beam information. And, the RS ID information may be based on a resource set configured for a beam control.

For example, the beam informing information may include information for a pair of the at least one of the TX beam information and the RX beam information.

For example, the node is an integrated access and backhaul (IAB) node, and the IAB node may support the MT operation and a distributed unit (DU) operation. Here, the MT operation may be an operation related to a communication between the node and the parent node, and the DU operation may be an operation related to a communication between the node and a child node or a communication between the node and a terminal. And, the node may receive configuration information for a frequency resource from the parent node, the configuration information may include hard (H) information, soft (S) information, or not available (NA) information, the H information may be information for a frequency resource on which a transmission/reception is available during the DU operation, the S information may be information for a frequency resource on which whether to transmit/receive is not determined during the DU operation, the NA information may be information for a frequency resource on which a transmission/reception is not available during the DU operation. Here, the node may perform a transmission/reception without a limitation of a beam resource during the DU operation, based on a determination that a specific frequency resource is an available resource by the H information or the S information.

Figure 18:
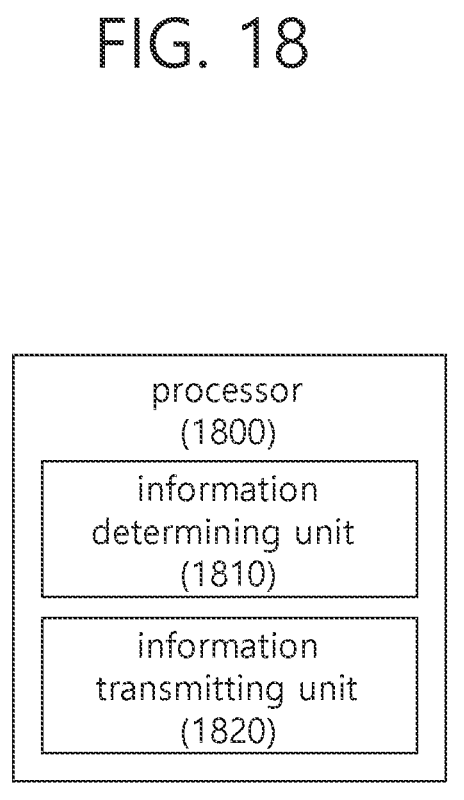

FIG. 18 is an example of a block diagram of an apparatus for transmitting beam indication information from a node's point of view, according to an embodiment of the present specification.

Referring to FIG. 18, the processor 1800 may include an information determining unit 1810 and an information transmitting unit 1820.

The information determining unit 1810 may be configured to determine beam indication information.

And, the information transmitting unit 1820 may be configured to transmit the beam indication information to the parent node.

Here, the beam indication information may include at least one recommended TX (transmission) beam information and RX (reception) beam information for a mobile terminal (MT) operation of the node.

Although not separately shown, a node may be provided. Anode may include a transceiver, at least one memory, and at least one processor operatively coupled to the at least one memory and the transceiver. The at least one processor may be configured to perform initial access with a parent node, determine beam indication information, and control the transceiver to transmit the beam indication information to the parent node. The beam indication information may include at least one recommended TX (transmission) beam information and RX (reception) beam information for a mobile terminal (MT) operation of the node.

In addition, although not separately shown, an apparatus may be provided. The apparatus may include at least one memory and at least one processor operatively coupled with the at least one memory. The at least one processor may be configured to perform initial access with a parent node, determine beam indication information, and control the transceiver to transmit the beam indication information to the parent node. The beam indication information may include at least one recommended TX (transmission) beam information and RX (reception) beam information for a mobile terminal (MT) operation of the node.

In addition, although not shown separately, a recording medium may be provided. At least one computer readable recording medium including instructions based on being executed by one processor (computer readable medium) may be configured to perform initial access with a parent node, determine beam indication information, and control the transceiver to transmit the beam indication information to the parent node. The beam indication information may include at least one recommended TX (transmission) beam information and RX (reception) beam information for a mobile terminal (MT) operation of the node.

FIG. 19 is a flowchart of a method of receiving beam indication information from a node's point of view, according to an embodiment of the present specification.

According to FIG. 19, a node may receive beam indication information from a child node (S1910).

Here, the beam indication information may include at least one recommended TX (transmission) beam information and RX (reception) beam information for a mobile terminal (MT) operation of the child node.

Figure 20:
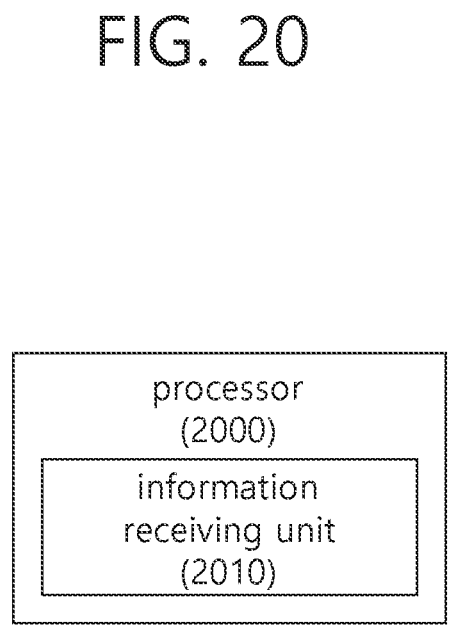

FIG. 20 is an example of a block diagram of an apparatus for receiving beam indication information from a node's point of view, according to an embodiment of the present specification.

Referring to FIG. 20, the processor 2000 may include an information receiving unit 2010.

The information receiving unit 2010 may be configured to receive beam indication information from a child node.

Here, the beam indication information may include at least one recommended TX (transmission) beam information and RX (reception) beam information for a mobile terminal (MT) operation of the child node.

Although not separately shown, a node may be provided. Anode may include a transceiver, at least one memory and at least one processor operatively coupled to the at least one memory and the transceiver. The at least one processor may be configured to perform initial access with a child node and configured to control the transceiver to receive the beam indication information from the child node. The beam indication information may include at least one recommended TX (transmission) beam information and RX (reception) beam information for a mobile terminal (MT) operation of the child node.

Up to now, the embodiments of the present specification have been described. And, according to the present specification, the following effects may be provided.

Before explaining the effect, the problems of the prior art will be described again as follows.

For SDM between the MT and the DU of the IAB node, the MT and the DU must perform transmission/reception using a beam direction suitable for SDM with less interference with each other. That is, it may be desirable to use a method of reducing inter-layer interference by using beams in which the DU and the MT are orthogonal to each other.

In this case, beam information to be applied by the IAB node in the MT operation of the IAB node is set by the parent node.

According to the prior art, a parent node does not know information about an appropriate beam direction when a (child) IAB node performs an SDM-based MT operation. This is because, in the prior art, the parent node did not receive information on a separate beam direction from the child node. That is, the parent node does not properly set a beam for the (child) IAB node to perform SDM, and thus, it is difficult to smoothly perform simultaneous operation of the IAB node.

In the present specification, as described above, the IAB-MT provides a configuration for reporting information on the beam resource of the MT that can be used for simultaneous operation to the parent node. In particular, in this specification, a feature is provided in which the IAB node reports DU Rx beam resource information (DL RS ID) of the MT and/or UL Tx beam resource information (SRI) of the MT that can be used for simultaneous operation to the parent node via MAC-CE.

According to this feature, the effect that the parent node according to the present specification can know information about the beam direction suitable for the SDM operation of the MT, and the parent node can properly set the Tx/Rx beam information of the MT to the IAB node, which is a child node, by reflecting this is provided. And, through this, since the IAB node can receive appropriate beam information from the parent node, the IAB node can smoothly perform simultaneous operation between the MT and the DU.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

Figure 21:
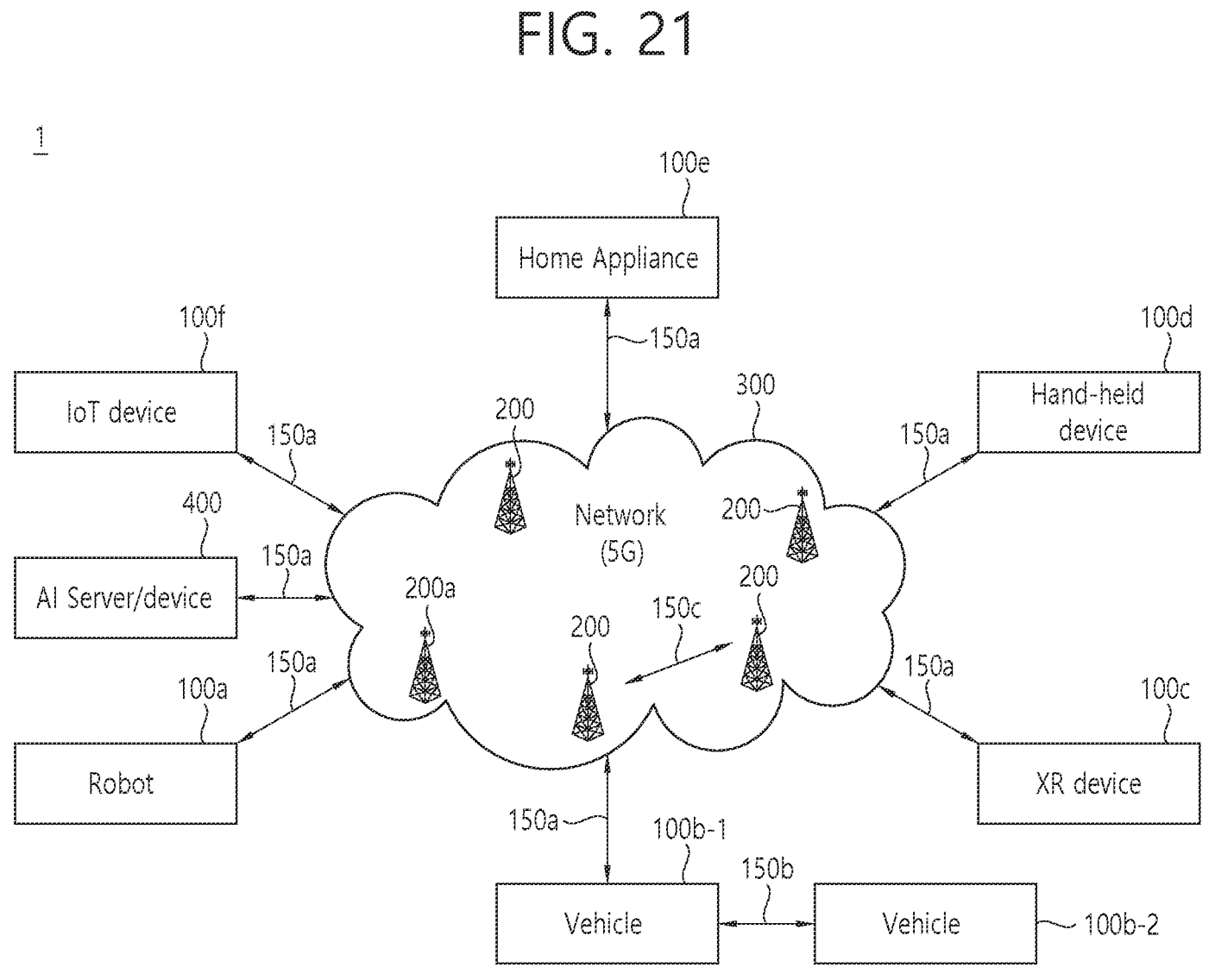

FIG. 21 shows an exemplary communication system (1), according to an embodiment of the present specification.

Referring to FIG. 21, a communication system (1) to which various embodiments of the present specification are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100*a*), vehicles (100*b*-1, 100*b*-2), an eXtended Reality (XR) device (100*c*), a hand-held device (100*d*), a home appliance (100*e*), an Internet of Things (IoT) device (100*f*), and an Artificial Intelligence (AI) device/ server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/ Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200*a*) may operate as a BS/network node with respect to other wireless devices.

The wireless devices (100*a*-100*f*) may be connected to the network (300) via the BSs (200). An Artificial Intelligence (AI) technology may be applied to the wireless devices (100*a*~100*f*) and the wireless devices (100*a*~100*f*) may be connected to the AI server (400) via the network (300). The network (300) may be configured using a 3G network, a 4G (e.g., LTE) network, or a 5G (e.g., NR) network. Although the wireless devices (100*a*~100*f*) may communicate with each other through the BSs (200)/network (300), the wireless devices (100*a*~100*f*) may perform direct communication (e.g., sidelink communication) with each other without passing through the BSs/network. For example, the vehicles (100*b*-1, 100*b*-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100*a*~100*f*).

Wireless communication/connections (150*a*, 150*b*, 150*c*) may be established between the wireless devices (100*a*~100*f*)/BS (200), or BS (200)/BS (200). Herein, the wireless communication/connections may be established through various RATs (e.g., 5G NR) such as uplink/down-link communication (150*a*), sidelink communication (150*b*) (or D2D communication), or inter BS communication (150*c*) (e.g., relay, Integrated Access Backhaul (IAB)). The wireless devices and the BSs/the wireless devices may transmit/receive radio signals to/from each other through the wireless communication/connections (150*a*, 150*b*, 150*c*). For example, the wireless communication/connections (150*a*, 150*b*, 150*c*) may transmit/receive signals through various physical channels. For this, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present specification.

Meanwhile, in NR, multiple numerologies (or subcarrier spacing (SCS)) for supporting various 5G services may be supported. For example, in case an SCS is 15 kHz, a wide area of the conventional cellular bands may be supported, and, in case an SCS is 30 kHz/60 kHz dense-urban, lower latency, and wider carrier bandwidth may be supported. In case the SCS is 60 kHz or higher, a bandwidth that is greater than 24.25 GHz may be used in order to overcome phase noise.

An NR frequency band may be defined as two different types of frequency ranges (FR1, FR2). The values of the frequency ranges may be changed (or varied), and, for example, the two different types of frequency ranges (FR1, FR2) may be as shown below in Table 4. Among the frequency ranges that are used in an NR system, FR1 may mean a "sub 6 GHz range", and FR2 may mean an "above 6 GHz range" and may also be referred to as a millimeter wave (mmW).

TABLE 4

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 5, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 may include an unlicensed band. The unlicensed band may be used for various purposes, e.g., the unlicensed band for vehicle-specific communication (e.g., automated driving).

TABLE 5

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 22:
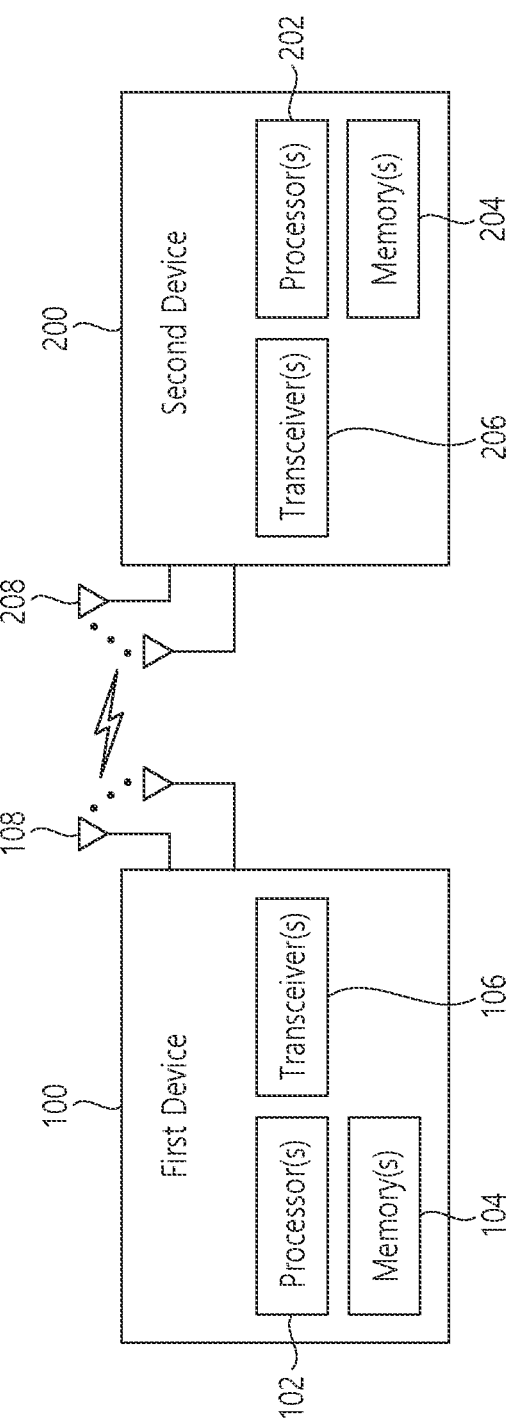
FIG. 22 shows an exemplary wireless device to which the present specification can be applied.

Hereinafter, an example of wireless devices to which the present specification is applied will be described in detail. FIG. 22 shows an exemplary wireless device to which the present specification can be applied. Referring to FIG. 22, a first wireless device (100) and a second wireless device (200) may transmit radio signals through a variety of RATs (e.g., LTE, NR). Herein, {the first wireless device (100) and the second wireless device (200)} may correspond to {the wireless device (100*x*) and the BS (200)} and/or {the wireless device (100*x*) and the wireless device (100*x*)} of FIG. 21. The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store various information related to operations of the processor(s) (102). For example, the memory(s) (104) may store software code including instructions for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present specification, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (206) and then store information obtained by processing the fourth information/signals in the memory(s) (204). The memory(s) (204) may be connected to the processor(s) (202) and may store various information related to operations of the processor(s) (202). For example, the memory(s) (204) may store software code including instructions for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF transceiver(s). In the present specification, the wireless device may represent a communication modem/circuit/chip.

Hereinafter, hardware elements of the wireless devices (100, 200) will be described in more detail. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, instructions, and/or a set of instructions.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, and so on, from RF band signals into baseband signals in order to process received user data, control information, radio signals/channels, and so on, using the one or more processors (102, 202). The one or more transceivers (106, 206) may convert the user data, control information, radio signals/channels, and so on, processed using the one or more processors (102, 202) from the base band signals into the RF band signals. For this, the one or more transceivers (106, 206) may include (analog) oscillators and/or filters.

Figure 23:
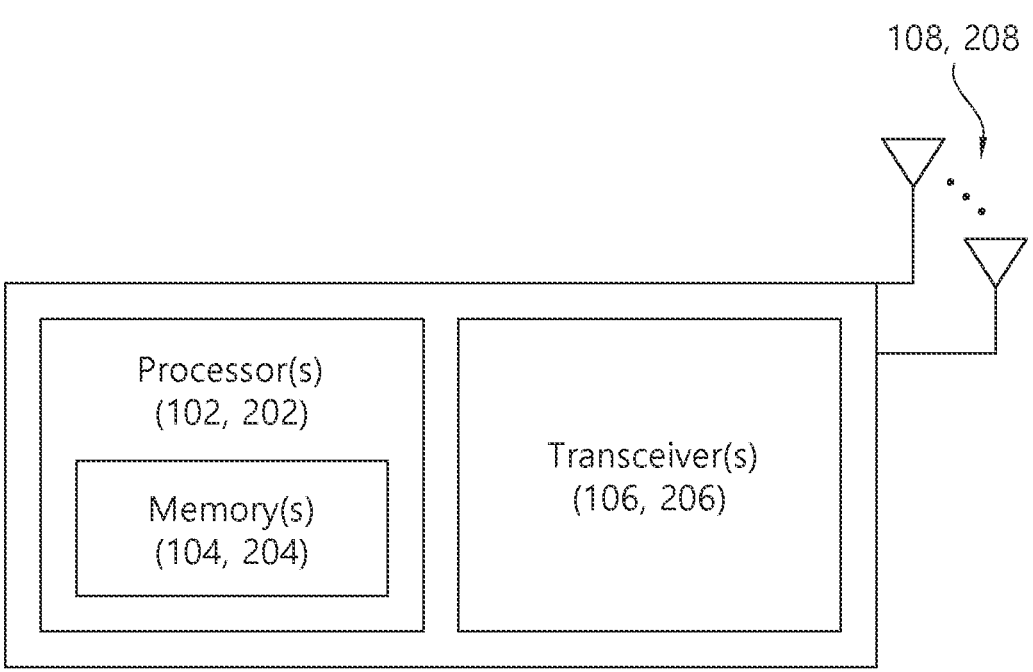
FIG. 23 shows another example of a wireless device applicable to the present specification.

FIG. 23 shows another example of a wireless device applicable to the present specification.

According to FIG. 23, the wireless device may include at least one processor (102, 202), at least one memory (104, 204), at least one transceiver (106, 206), and/or one or more antennas (108, 208).

As a difference between the example of the wireless device described above in FIG. 22 and the example of the wireless device in FIG. 23, in FIG. 22, the processors 102 and 202 and the memories 104 and 204 are separated, but in the example of FIG. 23, the memories 104 and 204 are included in the processors 102 and 202.

Here, a detailed description of the processors 102 and 202, the memories 104 and 204, the transceivers 106 and 206, and the one or more antennas 108 and 208 is as described above, in order to avoid unnecessary repetition of description, description of repeated description will be omitted.

Claims in the present specification may be combined in various ways. For instance, technical features in method claims of the present specification may be combined to be implemented or performed in an apparatus (or device), and technical features in apparatus claims may be combined to be implemented or performed in a method. Further, technical features in method claim(s) and apparatus claim(s) may be combined to be implemented or performed in an apparatus. Further, technical features in method claim(s) and apparatus claim(s) may be combined to be implemented or performed in a method.

What is claimed is:

1. A method, comprising:
transmitting, to a parent node, medium access control (MAC) control element (CE) comprising beam information by an integrated access and backhaul (IAB) node comprising an IAB-mobile terminal (MT) and an IAB-distributed unit (DU); and
receiving, from the parent node, restricted beam information by the IAB node,
wherein the beam information is related to at least one of an IAB-MT's recommended downlink beam and an IAB-MT's recommended uplink beam,
wherein the restricted beam information comprises information for an IAB-DU's restricted beam, and wherein the restricted beam information further comprises information for IAB-MT's downlink or uplink beams which are related with the IAB-DU's restricted beam.

2. The method of claim 1,
wherein the IAB node supports an IAB-MT operation and an IAB-DU operation.

3. The method of claim 2, wherein the IAB-MT operation is an operation related to a communication between the IAB-node and the parent node, and
wherein the IAB-DU operation is an operation related to a communication between the IAB-node and the child node or a communication between the IAB-node and the UE.

4. The method of claim 3, wherein the IAB-node receives configuration information for a frequency resource from the parent node,
wherein the configuration information includes hard (H) information, soft(S) information, or not available (NA) information,
wherein the H information is information for a frequency resource on which a transmission or reception is available during the IAB-DU operation,
wherein the S information is information for a frequency resource on which whether to transmit or to receive is not determined during the IAB-DU operation,
wherein the NA information is information for a frequency resource on which a transmission or a reception is not available during the IAB-DU operation.

5. The method of claim 4, wherein the IAB-node performs a transmission or a reception without a limitation of a beam resource during the IAB-DU operation, based on a determination that a specific frequency resource is an available resource by the H information or the S information.

6. An integrated access and backhaul (IAB) node including an IAB-mobile terminal (MT) and an IAB-distributed unit (DU), the IAB node comprising:
at least one transceiver;
at least one memory; and
at least one processor operatively coupled with the at least one memory and the at least one transceiver,
wherein the at least one memory stores instructions that, based on being executed by the at least one processor, cause the at least one processor to perform operations comprising:
transmitting, to a parent node, medium access control (MAC) control element (CE) comprising beam information; and
receiving, from the parent node, restricted beam information,
wherein the beam information is related to at least one of an IAB-MT's recommended downlink beam and an IAB-MT's recommended uplink beam,
wherein the restricted beam information comprises information for an IAB-DU's restricted beam, and
wherein the restricted beam information further comprises information for IAB-MT's downlink or uplink beams which are related with the IAB-DU's restricted beam.

7. A method, comprising:
receiving, by a parent node, medium access control (MAC) control element (CE) comprising beam information from an integrated access and backhaul (IAB) node including an IAB-mobile terminal (MT) and an IAB-distributed unit (DU); and
transmitting, by the parent node, restricted beam information to the IAB node, wherein the beam information is related to at least one of an IAB-MT's recommended downlink beam and an IAB-MT's recommended uplink beam, wherein the restricted beam information comprises information for an IAB-DU's restricted beam, and wherein the restricted beam information further comprises information for IAB-MT's downlink or uplink beams which are related with the IAB-DU's restricted beam.

* * * * *